US012576986B2

(12) United States Patent
Dong et al.

(10) Patent No.: US 12,576,986 B2
(45) Date of Patent: Mar. 17, 2026

(54) MOBILE WIRING HARNESS ANOMALY DETECTION SYSTEM

(71) Applicant: The Boeing Company, Arlington, VA (US)

(72) Inventors: John Jian Dong, Mukilteo, WA (US); Kevin Kuang-Hui Tseng, Lynnwood, WA (US); Naveed Moayyed Hussain, Palos Verdes Peninsula, CA (US)

(73) Assignee: The Boeing Company, Arlington, VA (US)

( * ) Notice: Subject to any disclaimer, the term of this patent is extended or adjusted under 35 U.S.C. 154(b) by 234 days.

(21) Appl. No.: 18/494,458

(22) Filed: Oct. 25, 2023

(65) Prior Publication Data

US 2025/0033795 A1    Jan. 30, 2025

Related U.S. Application Data

(60) Provisional application No. 63/516,215, filed on Jul. 28, 2023.

(51) Int. Cl.
B64D 45/00      (2006.01)
G01N 21/01      (2006.01)
(Continued)

(52) U.S. Cl.
CPC ...... B64D 45/00 (2013.01); B64D 2045/0085 (2013.01)

(58) Field of Classification Search
CPC ............ B64D 45/00; B64D 2045/0085; G06T 2207/20081; G06T 7/0004; G06V 10/82;
(Continued)

(56) References Cited

U.S. PATENT DOCUMENTS

2021/0041375 A1* 2/2021 Harjuhahto .............. G06N 3/08
2023/0126817 A1   4/2023 Goyal et al.
(Continued)

FOREIGN PATENT DOCUMENTS

CN      109872323 A  *  6/2019
CN      114764792 A  *  7/2022 .......... G06F 18/253
RU       2807987 C1 * 11/2023

OTHER PUBLICATIONS

European Patent Office Extended Search Report, dated Dec. 13, 2024, regarding Application No. EP24188247.1, 10 pages.
(Continued)

*Primary Examiner* — Harry Y Oh
(74) *Attorney, Agent, or Firm* — Yee & Associates, P.C.

(57)             ABSTRACT

An aerospace wiring harness inspection system comprises a mobile personal computing device; a camera system connected to the mobile personal computing device, a machine learning model running in the mobile personal computing device; and a controller. The machine learning model is trained to detect anomalies in a set of images of a wiring harness in an aerospace vehicle. The controller configured to control the camera system to generate a set of images of the wiring harness; send the set of images of the wiring harness to the machine learning model; and receive a result from the machine learning model indicating whether an anomaly is present in the wiring harness.

21 Claims, 21 Drawing Sheets

(51) Int. Cl.

| | |
|---|---|
| *G01N 21/88* | (2006.01) |
| *G06N 3/042* | (2023.01) |
| *G06N 3/0475* | (2023.01) |
| *G06N 3/094* | (2023.01) |
| *G06N 3/096* | (2023.01) |
| *G06N 20/00* | (2019.01) |
| *G06T 7/00* | (2017.01) |
| *G06V 10/764* | (2022.01) |
| *G06V 10/82* | (2022.01) |
| *G06V 20/52* | (2022.01) |

(58) Field of Classification Search
CPC .. G06V 20/52; G06V 10/764; G01N 21/8851; G01N 21/01; G01N 2021/0112; G01N 2021/0143; G01N 2021/0162; G01N 2021/8883; G01N 2021/8887; G06N 3/042; G06N 3/0475; G06N 3/094; G06N 3/096; G06N 20/00
See application file for complete search history.

(56) References Cited

U.S. PATENT DOCUMENTS

2023/0129522 A1\*  4/2023  Yoon ................... G01R 31/006
                                                382/141
2025/0117920 A1\*  4/2025  Erol ..................... G06T 7/0008

OTHER PUBLICATIONS

Lee Wei-Chen et al: "Application of Machine Vision to Inspect a Wiring Harness", 2019 IEEE International Conference on Industrial Cyber Physical Systems (ICPS), IEEE, May 6, 2019 (May 6, 2019), pp. 457-460, XP033585539, DOI: 10.1109/ICPHYS.2019.8780292 [retrieved on Jul. 29, 2019].
Mumuni Alhassan et al: "Data augmentation: A comprehensive survey of modern approaches", ARRAY, vol. 16, Nov. 15, 2022 (Nov. 15, 2022), p. 100258, XP093055455, ISSN: 2590-0056, DOI: 10.1016/j.array.2022.100258.

\* cited by examiner

702 ⌐    700 ⌐    704 ⌐    FIG. 7    ⌐706

| WIRE COMPONENT | ANOMALY CONDITION | RECOMMENDED DISPOSITION |
|---|---|---|
| CONDUCTOR | A STRAND OF THE CONDUCTOR IS BROKEN OR CUT | REPLACEMENT |
| | A PERMANENT BEND, HEIGHT LARGER THAN 2 X WIRE O.D. | REPLACEMENT |
| | A PERMANENT BEND, WIDTH SMALLER THAN 1.5 X WIRE O.D. | REPLACEMENT |
| INSULATION, EXTRUDED | A BULGE, A BUMP, A WRINKLE, OR A DENT | USE AS IS |
| | LIGHT ABRASION ON THE SURFACE | USE AS IS |
| | MEDIUM OR HEAVY ABRASION | INSULATION REPAIR |
| | A PUNCTURE THROUGH THE INSULATION | REPLACEMENT |
| | A NICK OR A CUT THAT EXTENDS INTO THE BLUE INNER LAYER OF THE INSULATION | REPLACEMENT |
| | A NICK OR A CUT THAT DOES NOT EXTEND INTO THE BLUE INNER LAYER OF THE INSULATION | USE AS IS |
| | MISSING OR TORN INSULATION AND THE CONDUCTOR CAN BE SEEN | REPLACEMENT |
| | MISSING OR TORN INSULATION, THE CONDUCTOR CANNOT BE SEEN, LONGITUDINAL LENGTH LARGER THAN 2 X WIRE O.D. | REPLACEMENT |
| | MISSING OR TORN INSULATION, THE CONDUCTOR CANNOT BE SEEN, CIRCUMFERENTIAL LENGTH LARGER THAN 1.5 X WIRE O.D. | REPLACEMENT |
| | MISSING OR TORN INSULATION, THE CONDUCTOR CANNOT BE SEEN, LONGITUDINAL LENGTH EQUAL TO OR SMALLER THAN 2 X WIRE O.D. | INSULATION REPAIR |
| | MISSING OR TORN INSULATION, THE CONDUCTOR CANNOT BE SEEN, CIRCUMFERENTIAL LENGTH EQUAL TO OR SMALLER THAN 1.5 X WIRE O.D. | INSULATION REPAIR |
| INSULATION, WRAPPED TAPE | A BULGE, A BUMP, A WRINKLE, OR A DENT | USE AS IS |
| | LIGHT ABRASION ON THE SURFACE | USE AS IS |
| | MEDIUM OR HEAVY ABRASION | INSULATION REPAIR |
| | A BROKEN BOND, CIRCUMFERENTIALLY LARGER THAN 1.5 X WIRE O.D. | REPLACEMENT |
| | A BROKEN BOND, CIRCUMFERENTIALLY EQUAL TO OR SMALLER THAN 1.5 X WIRE O.D. | USE AS IS |
| | A PUNCTURE THROUGH THE INSULATION | REPLACEMENT |
| | A NICK OR A CUT THAT EXTENDS INTO THE AMBER POLYIMIDE INNER LAYER OF THE INSULATION | REPLACEMENT |
| | A NICK OR A CUT THAT DOES NOT EXTEND INTO THE AMBER POLYIMIDE INNER LAYER OF THE INSULATION | USE AS IS |
| | MISSING OR TORN INSULATION AND THE CONDUCTOR CAN BE SEEN | REPLACEMENT |
| | MISSING OR TORN INSULATION, THE CONDUCTOR CANNOT BE SEEN, LONGITUDINAL LENGTH LARGER THAN 2 X WIRE O.D. | REPLACEMENT |
| | MISSING OR TORN INSULATION, THE CONDUCTOR CANNOT BE SEEN, CIRCUMFERENTIAL LENGTH LARGER THAN 1.5 X WIRE O.D. | REPLACEMENT |
| | MISSING OR TORN INSULATION, THE CONDUCTOR CANNOT BE SEEN, LONGITUDINAL LENGTH EQUAL TO OR SMALLER THAN 2 X WIRE O.D. | INSULATION REPAIR |
| | MISSING OR TORN INSULATION, THE CONDUCTOR CANNOT BE SEEN, CIRCUMFERENTIAL LENGTH EQUAL TO OR SMALLER THAN 1.5 X WIRE O.D. | INSULATION REPAIR |

1102

LARGE ML MODELS
ON THE CLOUD

1100 — LARGE ML
MODELS

1104 — TEACHER-STUDENT
TRANSFER LEARNING

1106 — SMALL ML
MODELS

ML MODELS WITH
SUFFICIENT PERFORMANCE
BUT SMALL FOOTPRINT THAT
FIT INTO THE DEVICES

1108 —

HANDHELD DEVICE FOR
REAL-TIME VISION-BASED
WIRING HARNESS HEALTH
INSPECTION FOR FIELD USE

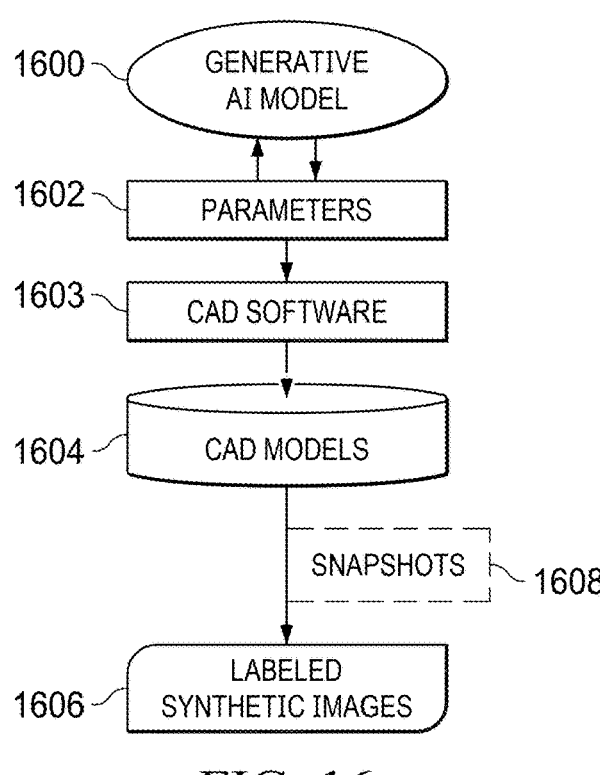

1600 — GENERATIVE AI MODEL

1602 — PARAMETERS

1603 — CAD SOFTWARE

1604 — CAD MODELS

SNAPSHOTS — 1608

1606 — LABELED SYNTHETIC IMAGES

FIG. 16

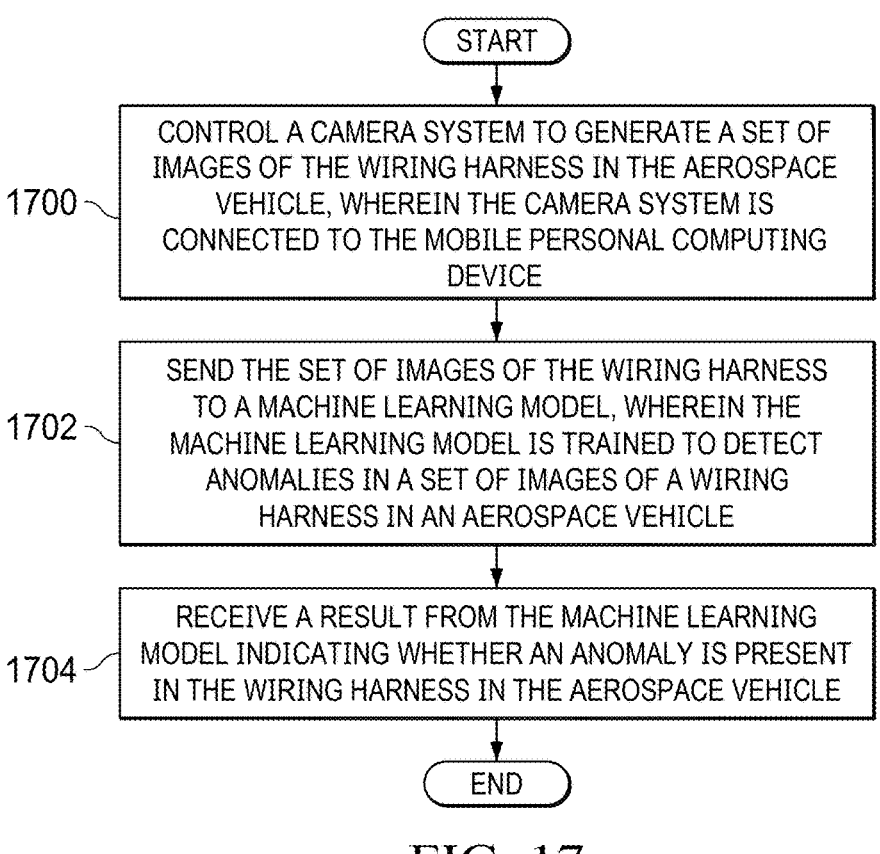

START

1700 — CONTROL A CAMERA SYSTEM TO GENERATE A SET OF IMAGES OF THE WIRING HARNESS IN THE AEROSPACE VEHICLE, WHEREIN THE CAMERA SYSTEM IS CONNECTED TO THE MOBILE PERSONAL COMPUTING DEVICE

1702 — SEND THE SET OF IMAGES OF THE WIRING HARNESS TO A MACHINE LEARNING MODEL, WHEREIN THE MACHINE LEARNING MODEL IS TRAINED TO DETECT ANOMALIES IN A SET OF IMAGES OF A WIRING HARNESS IN AN AEROSPACE VEHICLE

1704 — RECEIVE A RESULT FROM THE MACHINE LEARNING MODEL INDICATING WHETHER AN ANOMALY IS PRESENT IN THE WIRING HARNESS IN THE AEROSPACE VEHICLE

END

FIG. 17

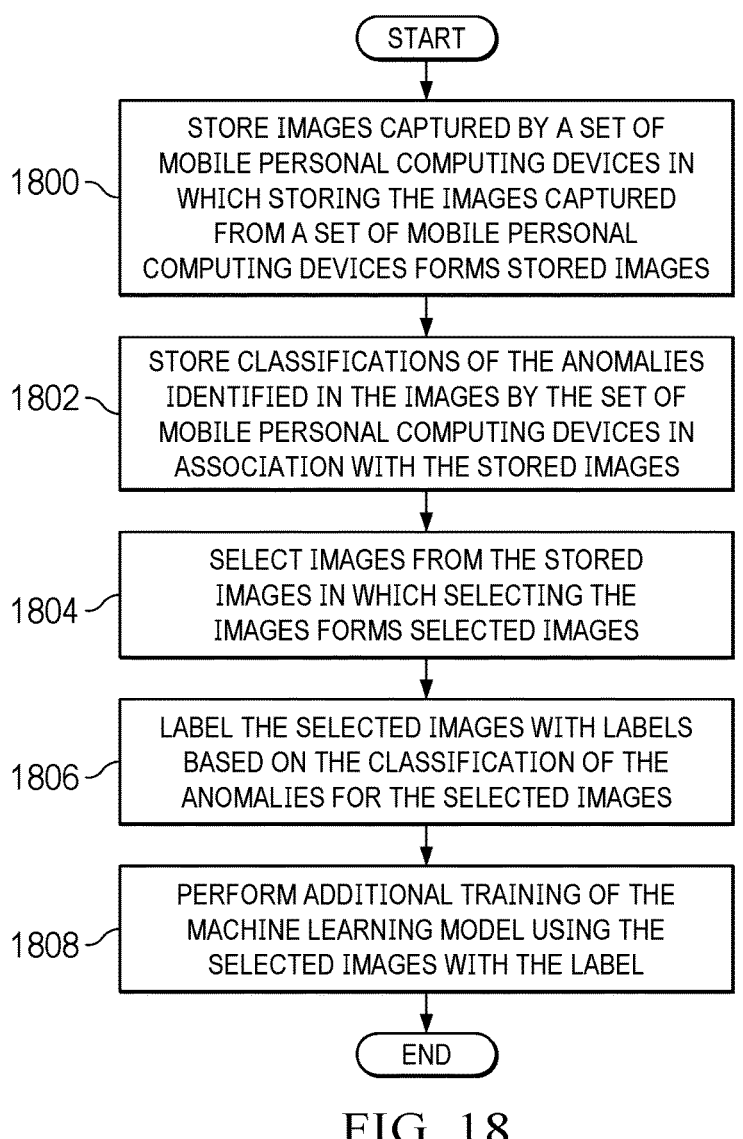

START

1800 — STORE IMAGES CAPTURED BY A SET OF MOBILE PERSONAL COMPUTING DEVICES IN WHICH STORING THE IMAGES CAPTURED FROM A SET OF MOBILE PERSONAL COMPUTING DEVICES FORMS STORED IMAGES

1802 — STORE CLASSIFICATIONS OF THE ANOMALIES IDENTIFIED IN THE IMAGES BY THE SET OF MOBILE PERSONAL COMPUTING DEVICES IN ASSOCIATION WITH THE STORED IMAGES

1804 — SELECT IMAGES FROM THE STORED IMAGES IN WHICH SELECTING THE IMAGES FORMS SELECTED IMAGES

1806 — LABEL THE SELECTED IMAGES WITH LABELS BASED ON THE CLASSIFICATION OF THE ANOMALIES FOR THE SELECTED IMAGES

1808 — PERFORM ADDITIONAL TRAINING OF THE MACHINE LEARNING MODEL USING THE SELECTED IMAGES WITH THE LABEL

END

FIG. 18

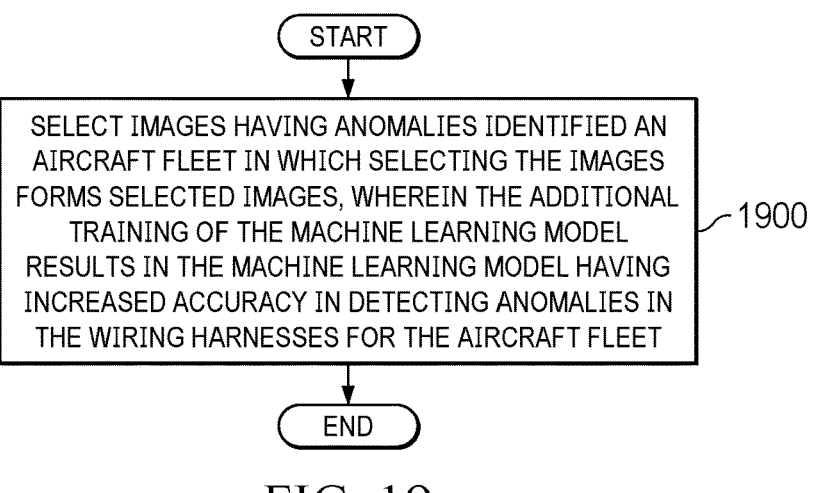

START

SELECT IMAGES HAVING ANOMALIES IDENTIFIED AN AIRCRAFT FLEET IN WHICH SELECTING THE IMAGES FORMS SELECTED IMAGES, WHEREIN THE ADDITIONAL TRAINING OF THE MACHINE LEARNING MODEL RESULTS IN THE MACHINE LEARNING MODEL HAVING INCREASED ACCURACY IN DETECTING ANOMALIES IN THE WIRING HARNESSES FOR THE AIRCRAFT FLEET — 1900

END

FIG. 19

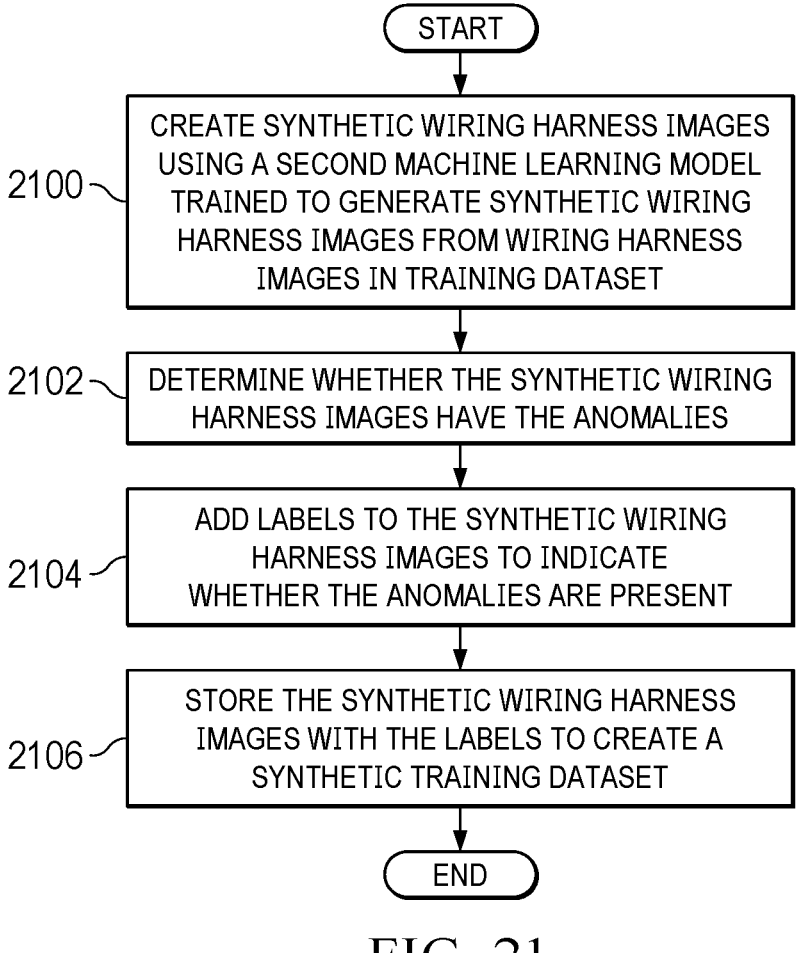

START

2100 — CREATE SYNTHETIC WIRING HARNESS IMAGES USING A SECOND MACHINE LEARNING MODEL TRAINED TO GENERATE SYNTHETIC WIRING HARNESS IMAGES FROM WIRING HARNESS IMAGES IN TRAINING DATASET

2102 — DETERMINE WHETHER THE SYNTHETIC WIRING HARNESS IMAGES HAVE THE ANOMALIES

2104 — ADD LABELS TO THE SYNTHETIC WIRING HARNESS IMAGES TO INDICATE WHETHER THE ANOMALIES ARE PRESENT

2106 — STORE THE SYNTHETIC WIRING HARNESS IMAGES WITH THE LABELS TO CREATE A SYNTHETIC TRAINING DATASET

END

2502 — SPECIFICATION AND DESIGN

2504 — MATERIAL PROCUREMENT

2506 — COMPONENT AND SUBASSEMBLY MANUFACTURING

2508 — SYSTEM INTEGRATION

2510 — CERTIFICATION AND DELIVERY

2512 — IN SERVICE

2514 — MAINTENANCE AND SERVICE

2600

AIRCRAFT

2602 — AIRFRAME     INTERIOR — 2606

SYSTEMS

PROPULSION SYSTEM     ELECTRICAL SYSTEM 2608   2612     2610   2614

HYDRAULIC SYSTEM     ENVIRONMENTAL SYSTEM

— 2604

MOBILE WIRING HARNESS ANOMALY DETECTION SYSTEM

CROSS-REFERENCE TO RELATED APPLICATION

This application claims the benefit of U.S. Provisional patent application Ser. No. 63/516,215, filed Jul. 28, 2023, and entitled "Mobile Wiring Harness Anomaly Detection System," which is incorporated herein by reference in its entirety.

BACKGROUND INFORMATION

1. Field

The present disclosure relates generally to inspecting and in particular, to inspecting wiring systems for vehicles during manufacturing and maintenance.

2. Background

Wiring harnesses are installed in different vehicles such as aircraft, ground vehicles, marine vessels, spacecraft, and other types of vehicles. A wiring harness is an assembly of electrical cables or wires that transmit electrical signals or electrical power. These cables are secured or bound together by components such as straps, ties, sleeves, tape, conduits, or other types of components.

Wiring harnesses are used in vehicles to help simplify the installation of different electrical components. The use of wiring harnesses can also reduce time and installation costs while improving system rubber viability. For example, aircraft wiring harnesses can be used to connect different electrical components such as avionics equipment, navigation systems, computers, lighting systems, entertainment systems, and other systems and components in aircraft.

The use of wiring harnesses and aircraft enables bundling many wires into a single unit. The wires in a wiring harness can have a specific and known path reducing complexity in time for installation and inspection. Further, wiring harnesses are designed to withstand various environmental conditions and can increase the safety and reliability of electronic systems in aircraft.

SUMMARY

An embodiment of the present disclosure provides an aerospace wiring harness inspection system comprising a mobile personal computing device; a camera system connected to the mobile personal computing device, a machine learning model running in the mobile personal computing device; and a controller. The machine learning model is trained to detect anomalies in a set of images of a wiring harness in an aerospace vehicle. The controller configured to control the camera system to generate a set of images of the wiring harness; send the set of images of the wiring harness to the machine learning model; and receive a result from the machine learning model indicating whether an anomaly is present in the wiring harness.

Another embodiment of the present disclosure provides a platform wiring inspection system comprising a mobile personal computing device; a camera system connected to the mobile personal computing device; a machine learning model running in the mobile personal computing device; and a controller. The machine learning model is trained to detect anomalies in images of wiring harnesses for a platform. The controller configured to control the camera system to generate a set of images of a wiring harness; send the set of images of the wiring harness to the machine learning model; and receive a result from the machine learning model indicating whether an anomaly is present in the wiring harness.

Still another embodiment of the present disclosure provides a method for inspecting a wiring harness in an aerospace vehicle. A computer system controls a camera system to generate a set of images of the wiring harness in the vehicle, wherein the camera system is connected to the mobile personal computing device. The computer system sends the set of images of the wiring harness to a machine learning model, wherein the machine learning model is trained to detect anomalies in a set of images of a wiring harness in an aerospace vehicle. The computer system receives a result from the machine learning model indicating whether an anomaly is present in the wiring harness in the aerospace vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a table wiring components and anomalies for wiring components are with recommended dispositions in accordance with an illustrative embodiment;

FIG. 16 is an illustration of a data flow diagram for synthetic image generation in accordance with an illustrative embodiment;

FIG. 17 is an illustration of a flowchart of a process for inspecting a wiring harness in an aerospace vehicle in accordance with an illustrative embodiment;

FIG. 18 is an illustration of a flowchart of a process for creating training data in accordance with an illustrative embodiment;

FIG. 19 is an illustration of a flowchart of process for selecting images in accordance with an illustrative embodiment;

FIG. 21 is an illustration of a flowchart of a process for generating training data in accordance with an illustrative embodiment;

DETAILED DESCRIPTION

The illustrative embodiments recognize and take into account one or more different considerations. For example, monitoring the health of wiring party systems is important in determining proper maintenance and rework as needed. With large commercial aircraft, the amount of wiring can exceed a hundred miles. For example, a commercial aircraft may have 330 or more miles of wiring. Further with the use of wiring harnesses, a complex network of interconnected cables extends through the aircraft connecting various systems components.

As result, inspecting the different wiring harnesses in an aircraft can be more difficult than desired.

Thus, the illustrative examples provide a system, apparatus, method, and computer program product for inspecting wiring harnesses for platforms such as aerospace vehicles. An aerospace wiring harness inspection system comprises a mobile personal computing device; a camera system connected to the mobile personal computing device, a machine learning model running in the mobile personal computing device; and a controller. The machine learning model is trained to detect anomalies in a set of images of a wiring harness in an aerospace vehicle. The controller configured to control the camera system to generate a set of images of the wiring harness; send the set of images of the wiring harness to the machine learning model; and receive a result from the machine learning model indicating whether an anomaly is present in the wiring harness.

Further, the illustrative examples provide an ability to generate sufficient amounts of training data to train machine learning models in detecting anomalies in wiring harnesses with a desired level of accuracy. Additional training data can be added to the training datasets the different examples through the use of image augmentation, image creation using models and anomaly definitions from engineering standard handbooks that define and illustrate anomalies for wire and cable systems. Further, the illustrative examples provide an ability to increase accuracy in detecting anomalies for particular fleets over time through feedback loops. These and other illustrative features are described herein.

Figure 1:
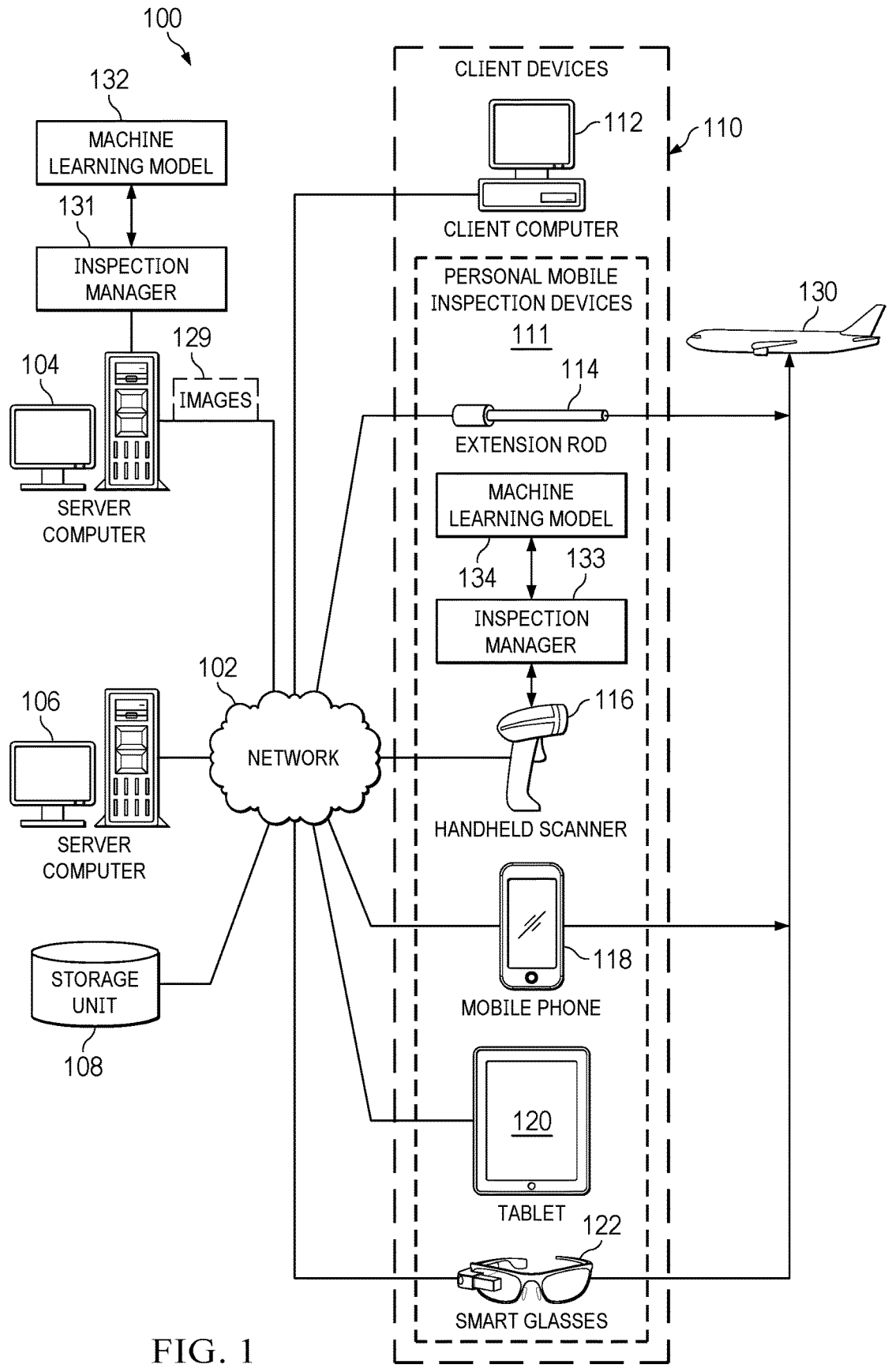
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. Client devices 110 can be, for example, computers, workstations, network computers, vehicles, machinery, appliances, or other devices that can process data. As depicted in this example, client devices 110 include client computer 112, extension rod 114, handheld scanner 116 116, mobile phone 118, tablet computer 120, and smart glasses 122. Client devices 110 can also include, for example, computers, workstations, or network computers. In the depicted example, server computer 104 provides information, such as boot files, operating system images, and applications to client devices 110.

In the depicted example, server computer 104 provides information, such as boot files, operating system images, and applications to client devices 110. Further, in this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols or other networking protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In this illustrative example, client devices 110 include personal mobile inspection devices 111. Personal mobile inspection devices 111 are any computing devices that can be held or worn by a person. Further, personal mobile inspection devices 111 also include camera systems that can generate images 129. In this example, personal mobile inspection devices 111 comprise extension rod 114, hand-held scanner 116, mobile phone 118, tablet computer 120, and smart glasses 122 can be used to inspect wiring harnesses in platform such as commercial aircraft 130.

In one illustrative example, one or more of personal mobile inspection devices 111 can be operated by a human operator to generate images 129 of wiring harnesses in commercial aircraft 130.

In one illustrative example, images 129 from these personal mobile inspection devices can be sent to inspection manager 131 over network 102. In this example, inspection manager 131 is located on server computer 104. As depicted, inspection manager 131 uses machine learning model 132 to determine whether anomalies are present in one or more of the wiring harnesses in commercial aircraft 130.

In another illustrative example, a personal mobile inspection device can operate in a standalone fashion. For example, handheld scanner 116 can generate and analyze images without sending images to inspection manager 131 for analysis. With this example, inspection manager 133 and machine learning model 134 are located in handheld scanner 116. With this implementation, machine learning model 134 has a smaller size as compared to machine learning model 132. The size of machine learning model 134 is selected to enable machine learning model 134 to be located on and run on handheld scanner 116. In this example, machine learning model 134 can be created using knowledge distillation in which a teacher machine learning model trains a student machine learning model. In this example, machine learning model 134 is the resulting student model.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Figure 2:
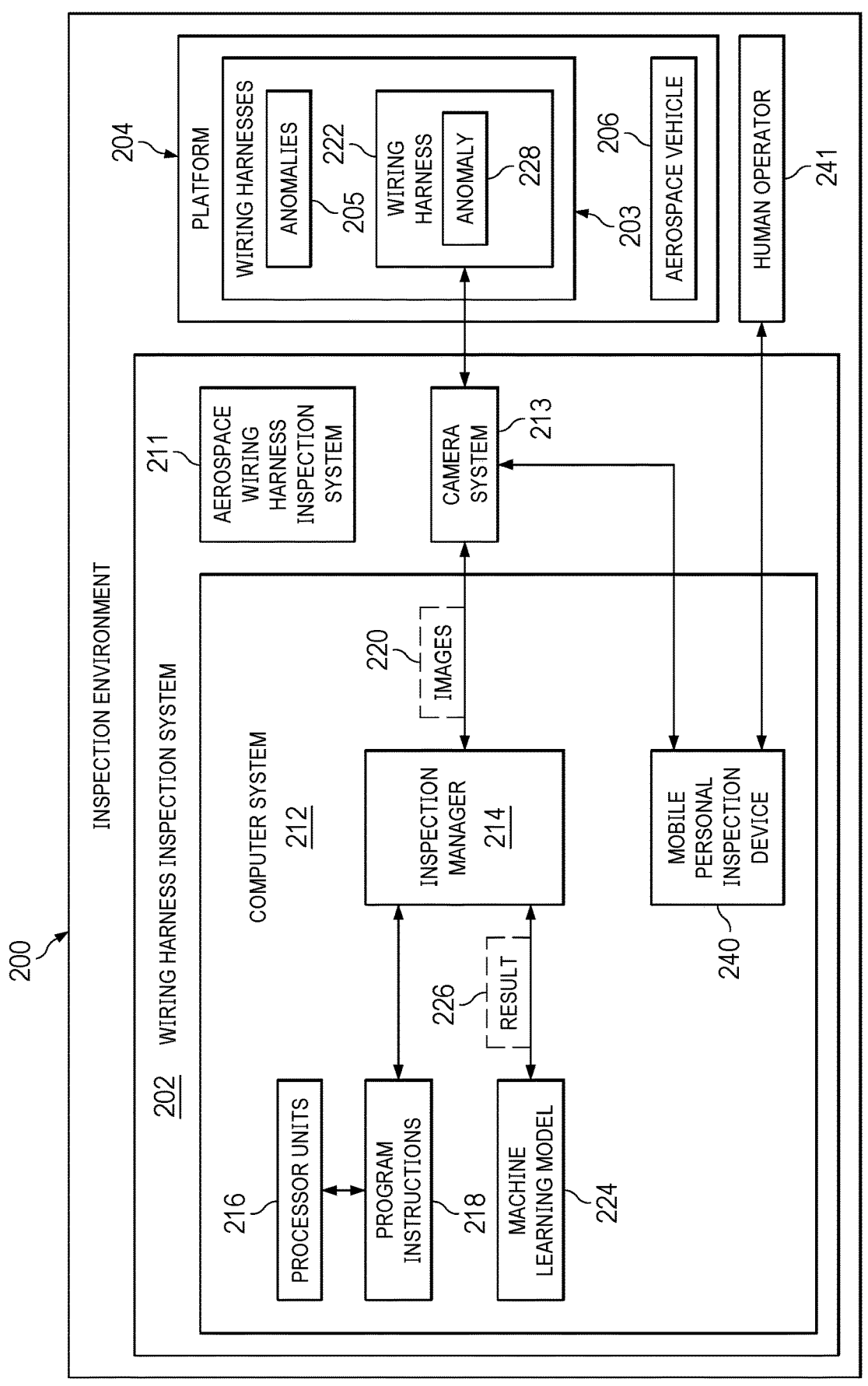
FIG. 2 is an illustration of a block diagram of an inspection environment in accordance with an illustrative embodiment.

With reference now to FIG. 2, an illustration of a block diagram of an inspection environment is depicted in accordance with an illustrative embodiment. In this illustrative example, inspection environment 200 includes components that can be implemented in hardware such as the hardware shown in network data processing system 100 in FIG. 1. In this example, wiring harness inspection system 202 can operate to inspect wiring harnesses 203 in platform 204. This inspection is performed to determine whether anomalies 205 is present in wiring harnesses 203 in platform 204.

In this depicted example, platform 204 takes the form of aerospace vehicle 206. Aerospace vehicle 206 can include both atmospheric vehicles and space vehicles. For example, aerospace vehicle 206 can be an a commercial aircraft, a rotorcraft, a tilt-rotor aircraft, a tilt wing aircraft, a vertical takeoff and landing aircraft, an electrical vertical takeoff and landing vehicle, a personal air vehicle, a spacecraft, a jet aircraft, and a space shuttle, or other type of aerospace vehicle. When used to inspect aerospace vehicle 206, wiring harness inspection system 202 is aerospace wiring harness inspection system 211.

In this illustrative example, wiring harness inspection system 202 comprises computer system 212, camera system 213, inspection manager 214. Camera system 213 comprises one or more cameras. Camera system 213 is connected to computer system 212.

In this example, inspection manager 214 is located in computer system 212. Inspection manager 214 can be implemented in software, hardware, firmware or of other commitments to a combination thereof. When software is used, the operations performed by inspection manager 214 can be implemented in program instructions configured to run on hardware, such as a processor unit. When firmware is used, the operations performed by inspection manager 214 can be implemented in program instructions and data and stored in persistent memory to run on a processor unit. When hardware is employed, the hardware can include circuits that operate to perform the operations in inspection manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, inspection manager 214 controls camera system 213 to generate a set of images 220 of wiring harness 222 in wiring harnesses 203. In this example, camera system 213 sends images 220 to inspection manager 214 for analysis. Inspection manager 214 sends the set of images 220 to machine learning model 224. Machine learning model 224 can be implemented using a neural network, a random forest model, a decision tree, a convolutional neural network (CNN), a recurrent neural network (RNN), a generative machine learning model trained using a generative adversarial network (GAN), a transfer learning model, and other suitable types of machine learning models.

In this example, machine learning model 224 is trained to detect anomaly 228 in a set of images 220 of wiring harness 222 in platform 204, such as aerospace vehicle 206. In response, inspection manager 214 receives result 226 from the machine learning model indicating whether anomaly 228 is present in wiring harness 222.

In one illustrative example, computer system 212 includes mobile personal inspection device 240. With this example, mobile personal inspection device 240 can be a computing device that can be held or worn by human operator 241. Mobile personal inspection device 240 can be selected from a group comprising an extension rod, a handheld scanner, a smart phone, a mobile phone, a tablet, smart glasses, augmented reality goggles, a laptop computer, a smart watch, or other device.

In this example, camera system 213 is connected to mobile personal inspection device 240. When one component is "connected" to another component, the connection is a physical connection. For example, a first component, camera system 213, can be considered to be physically connected to a second component, mobile personal inspection device 240, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

With this example, mobile personal inspection device 240 generates images 220 using camera system 213 and sends images 220 to inspection manager 214 for analysis.

In another illustrative example, mobile personal inspection device 240 can operate as a stand-alone device without needing to send images over a network or wireless connection for analysis. With this example, inspection manager 214 and machine learning model 224 can be located and mobile personal inspection device 240.

In one illustrative example, one or more technical solutions are present that overcome a technical problem with identifying anomalies in long lengths of wiring harnesses in aerospace vehicles. As a result, one or more solutions may provide a technical effect enabling the creation of machine learning models that provide a desired level accuracy in identifying anomalies in wiring harnesses located in platforms such as aerospace vehicles.

The use of the wiring harness inspection system in the different illustrative examples can result in identifying anomalies in wiring harnesses more efficiently as compared to current techniques. The use of machine learning models with specialized training datasets and training operations for training machine learning models that focus on wiring harnesses for aerospace vehicles can result in increased efficiency in identifying anomalies. In the different illustrative examples, the training datasets can be generated in a manner that provides increased amounts of training data for training machine learning models to identify wiring harness anomalies.

Further, with the use of feedback loops and continued training machine learning models, the aerospace wiring harness inspection system can have increasing accuracy in identifying anomalies. This increase in accuracy can be focused on specific aircraft fleets through the use of the wiring harness inspection system on those specific aircraft leads. Further, by continuing to train machine learning models based on images from those aircraft fleets, the machine learning models can more efficiently and accurately identify anomalies that occur over time that are specific to those aircraft fleets.

Additionally, the aerospace wiring harness inspection system can be implemented in mobile personal computing devices such as handheld scanners, mobile phones, smart glasses, and other devices. In these illustrative examples, the machine learning models can be created for use in these mobile personal computing devices such that the mobile computing devices can function as standalone devices without needing to send images to another location for analysis.

Computer system 212 can be configured to perform at least one of the steps, operations, or actions described in the different illustrative examples using software, hardware, firmware or a combination thereof. As a result, computer system 212 operates as a special purpose computer system in which inspection manager 214 in computer system 212 enables at least one of more efficient or more accurate inspections to identify anomalies 205 and wiring harnesses 203. In particular, inspection manager 214 transforms computer system 212 into a special purpose computer system as compared to currently available general computer systems that do not have inspection manager 214.

The illustration of inspection environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, wiring harness inspection system 202 can be used to inspect wiring harnesses in other platforms in addition to or in place of the aerospace vehicle 206. For example, platform 204 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle a personal air vehicle, a surface ship, a tank, a personnel carrier, a train, a spacecraft, a space station, a satellite, a submarine, an automobile, a power plant, a bridge, a dam, a house, a manufacturing facility, and a building. Wiring harness inspection system 202 can also be referred to as an aerospace wiring harness inspection system.

Figure 3:
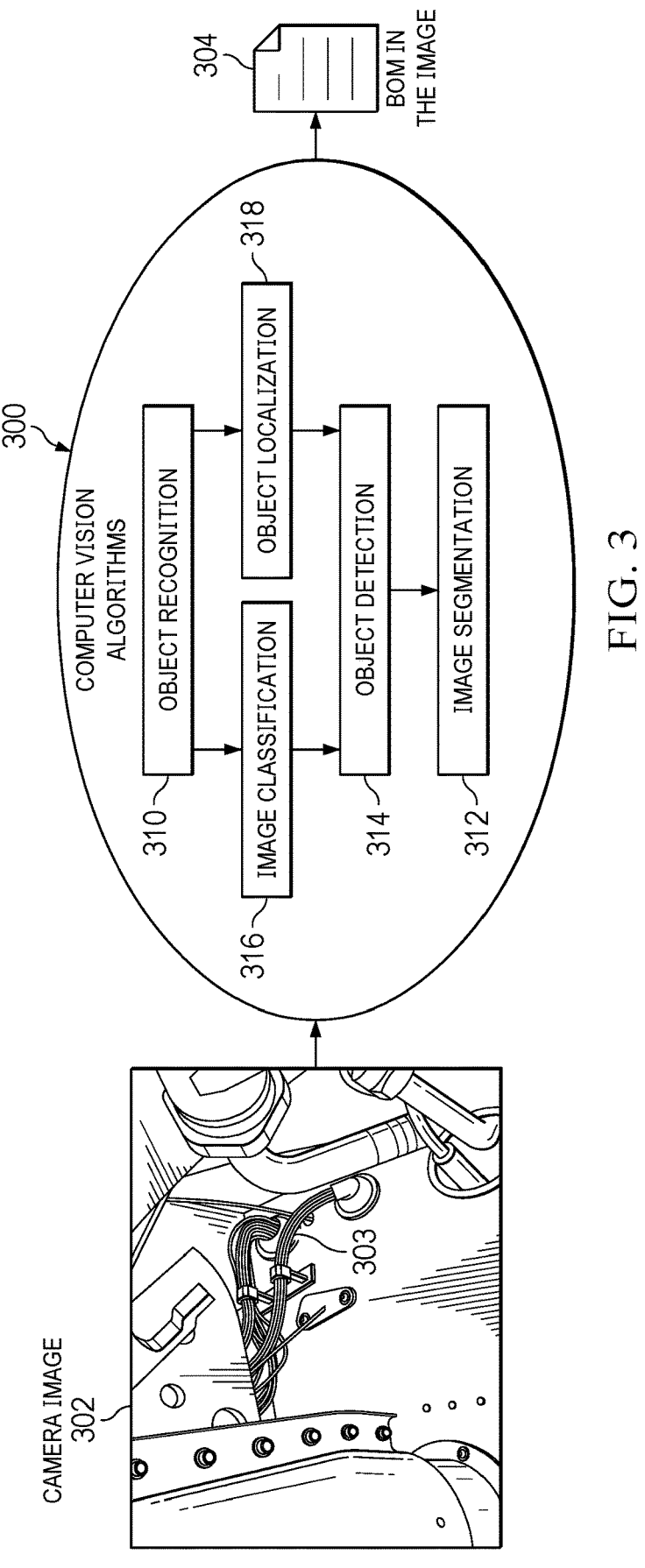
FIG. 3 is an illustration of object recognition using a compilation on neural network-based computer vision out in accordance with an illustrative embodiment.

With reference next to FIG. 3, an illustration of object recognition using a compilation on neural network-based computer vision out is depicted in accordance with an illustrative embodiment. In this example, convolutional neural network (CNN) 300 is an example of an implementation of machine learning model 224 in FIG. 2.

In this illustrative example, convolutional neural network 300 can receive camera image 302 containing wiring harness 303 and generate a bill of materials (BOM) 304 for anomalies identified for the wiring harness in camera image 302. Further, bill of materials 304 can also include a history of anomalies, rework, maintenance, or other actions taken with respect to wiring harness 303.

In this illustrative example, convolutional neural network 300 performs object recognition 310 using computer vision algorithms. In this example, the computer vision algorithms for object recognition 310 can include a number of different components such as image segmentation 312, object detection 314, image classification 316, object localization 318.

In this example, image segmentation 312 can include separating pixels in camera image 302 to create segments. These segments may separate wiring harness 303 from the background. This separation facilitates identifying the wiring harness in camera image 302.

Object detection 314 can include detecting specific objects in camera image 302. These objects can be specific objects such as wiring harness 303 that convolutional neural network 300 has been trained to identify from image pixels in camera image 302.

In this example, image classification 316 can be used to determine whether an anomaly is present in camera image 302. In some cases, the classification can include no anomaly in addition to different types of anomalies. Further, image classification 316 can also be used for Image selection and labeling. The selection of images and labeling can be used to create training datasets for training machine learning models to classify a type of anomaly in an image.

Object localization 318 can include detecting bounding boxes in camera image 302 that contains a specific object such as wiring harness 303. In this example, convolutional neural network 300 has been trained to identify wiring harnesses.

Figure 4:
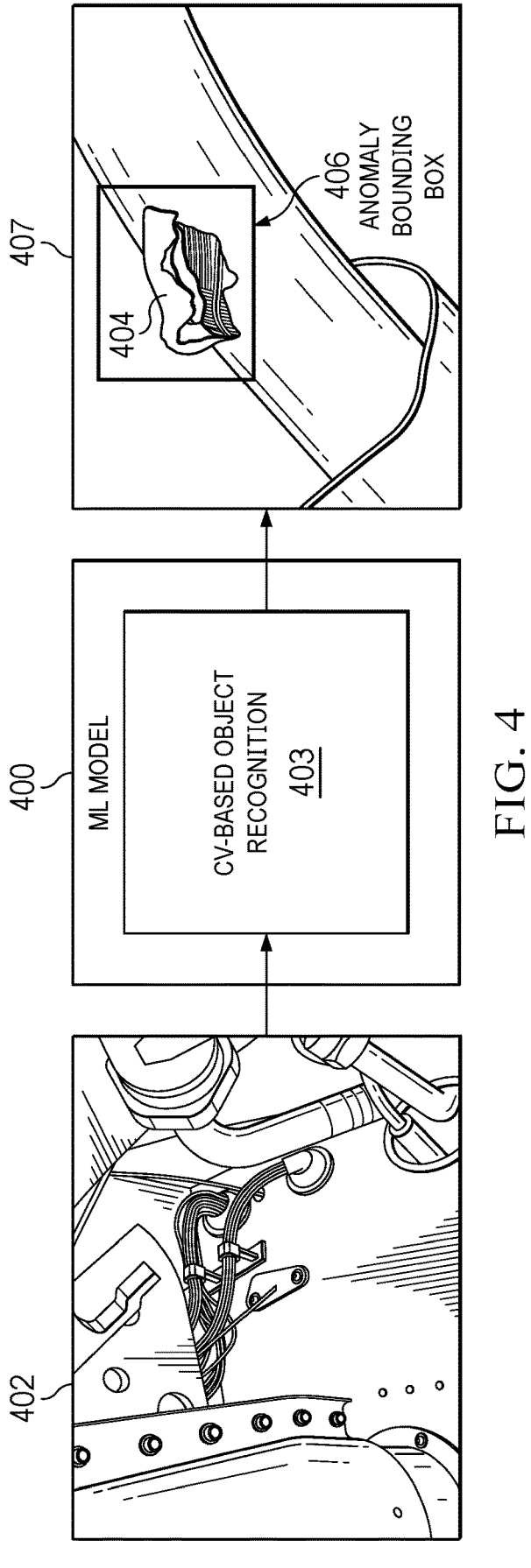
FIG. 4 is an illustration of anomaly detection using a machine learning model in accordance with an illustrative embodiment.

With reference next to FIG. 4, an illustration of anomaly detection using a machine learning model is depicted in accordance with an illustrative embodiment. As depicted in this example, anomaly detection can be performed using machine learning (ML) model 400. In this example, machine learning model 400 performs computer vision (CV) based object recognition 403.

In this example, machine learning model 400 receives image 402 as an input for analysis. In this example, machine learning model 400 identifies anomaly 404 and outputs image 407 with an enlarged view of image 402 showing anomaly 404. In this example, anomaly 404 is indicated using anomaly bounding box 406. In this example, machine learning model 400 performs this analysis and identification of anomaly 404 using computer vision-based object recognition that can include components such as those for object recognition 310 as illustrated in FIG. 3.

Figure 5:
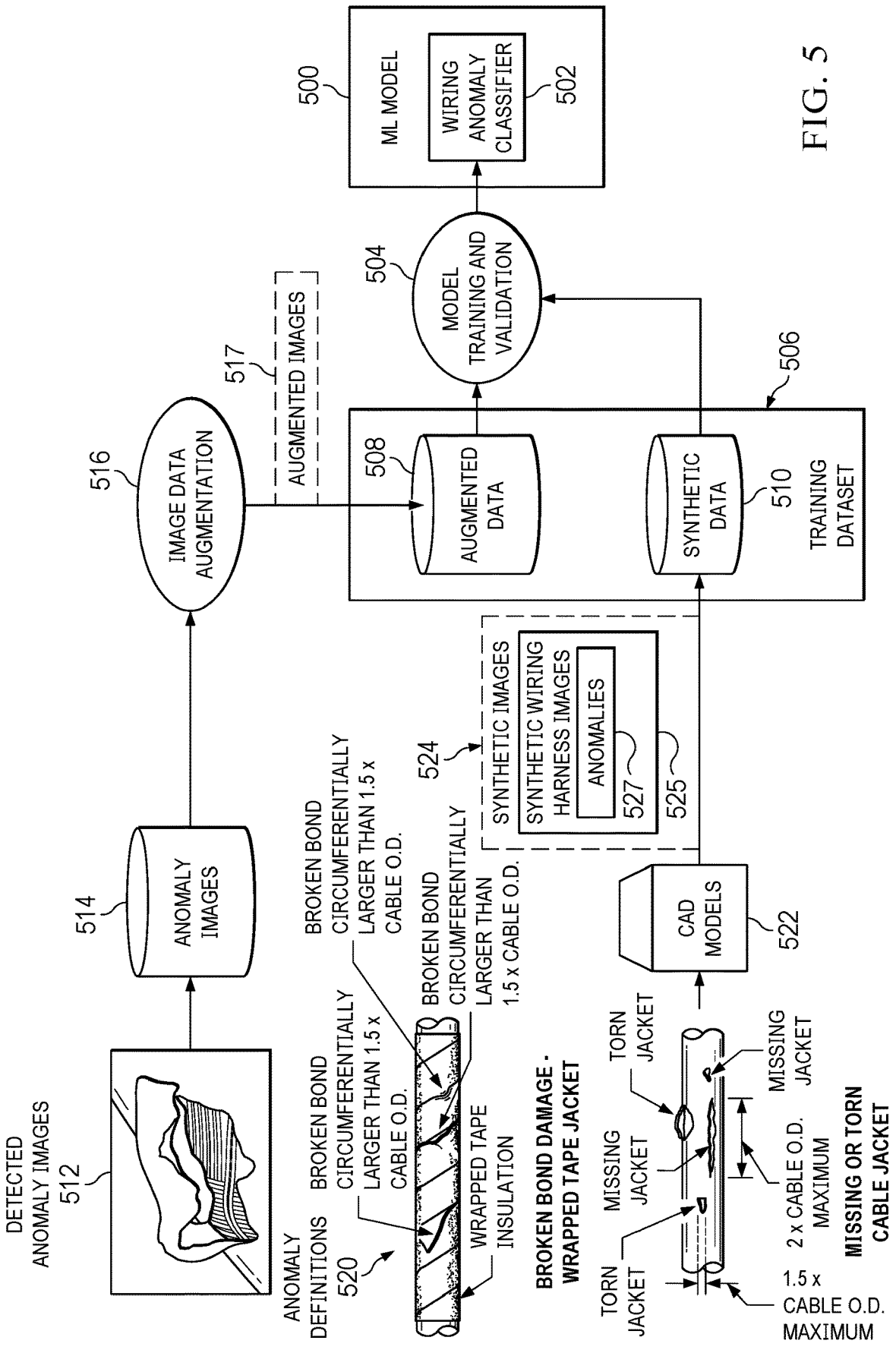
FIG. 5 is an illustration of machine learning model training in accordance with an illustrative embodiment.

Next in FIG. 5, an illustration of machine learning model training is depicted in accordance with an illustrative embodiment. In this illustrative example, machine learning model 500 is implemented as wiring anomaly classifier 502.

In this example, model training and validation 504 is performed on machine learning model 500 machine learning model 500 to train machine learning model 500 to operate as wiring anomaly classifier 502.

In this example, the training is performed using training dataset 506. Training dataset 506 is comprised of augmented data 508 generated from images and synthetic data 510. These types of data are used in addition to actual images to increase the amount of training data available for training machine learning model 500.

The different illustrative examples provide an ability to generate additional images for training dataset 506 in a manner that increases the accuracy of machine learning model 500 operating as wiring anomaly classifier 502. As depicted in this example, the images in augmented data 508 and synthetic data 510 are created in a manner that provides an increased number of images showing anomalies in a manner that increases the accuracy of machine learning model 500.

In this illustrative example, detected anomaly images 512 can be identified and stored as anomaly images 514. In this example, image data augmentation 516 can be performed on anomaly images 514 to create augmented images 517. These augmented images are stored as augmented data 508. In this illustrative example, augmentation of anomaly images 514 can include at least one of translating, rotating, scaling, or other types of manipulations of anomaly images 514. As a result, the number of images that can be used for training machine learning model 500 can be increased by performing image data augmentation 516 on anomaly images 514. By increasing the number of images in training dataset 506, the performance of machine learning model 500 can be increased through increasing the size of training dataset 506. In this example, augmented data 508 includes anomaly images 514 and images generated from augmenting anomaly images 514.

Additionally, the size of training dataset 506 can be increased through the use of synthetic data 510. In this example, synthetic data 510 comprises images that are created and not based on actual images such as detected anomaly images 512.

For example, synthetic data 510 can be created using anomalies in anomaly definitions 520 defined in engineering standard handbooks and computer-aided design (CAD) models 522. These two sources of information can be used to create images that form synthetic data 510. In this example, the identification of anomalies as defined in engineering standard handbooks and other sources can be used to add those anomalies in CAD models 522 or to generate images with the anomalies using CAD models 522. CAD models 522 with anomalies based on anomaly definitions 520 can then be used to generate synthetic images 524 that form synthetic data 510. In this example, snapshot images of CAD models 522 with anomalies can be taken from different orientations perspectives and can be generated to create synthetic images 524. In this example, synthetic images 524 are synthetic wiring harness images 525 with anomalies 527. These images are synthetic wiring anomaly images.

Further, anomaly definitions 520 can also include identifications of types of anomalies such as fold, wrinkle, scratch, light abrasion, broken bond circumferentially, conducted information, or other types of anomalies. These identifications can be used as labels when generating synthetic images 524 using CAD models 522.

The illustration of training dataset generation in this example is provided as an example implementation and not meant to limit the manner in which other illustrative examples can be implemented. For example, image data augmentation 516 can also be performed on synthetic images 524 to create additional images for augmented images 517 in addition to those created using anomaly images 514. As another example, although not shown, the images and augmented data 508 and synthetic data 510 can include labels depending on the type of training used to train machine learning model 500.

As a result, by using the anomaly types defined in anomaly definitions 520 is labels, machine learning model 500 can output classifications based on the anomaly types in anomaly definitions 520 after model training and validation 504 is performed using training dataset 506. In this manner, classifications generated by machine learning model 500 can conform to desired definitions such as those used by industry, manufacturers, suppliers, airlines, or other organizations.

Figure 6:
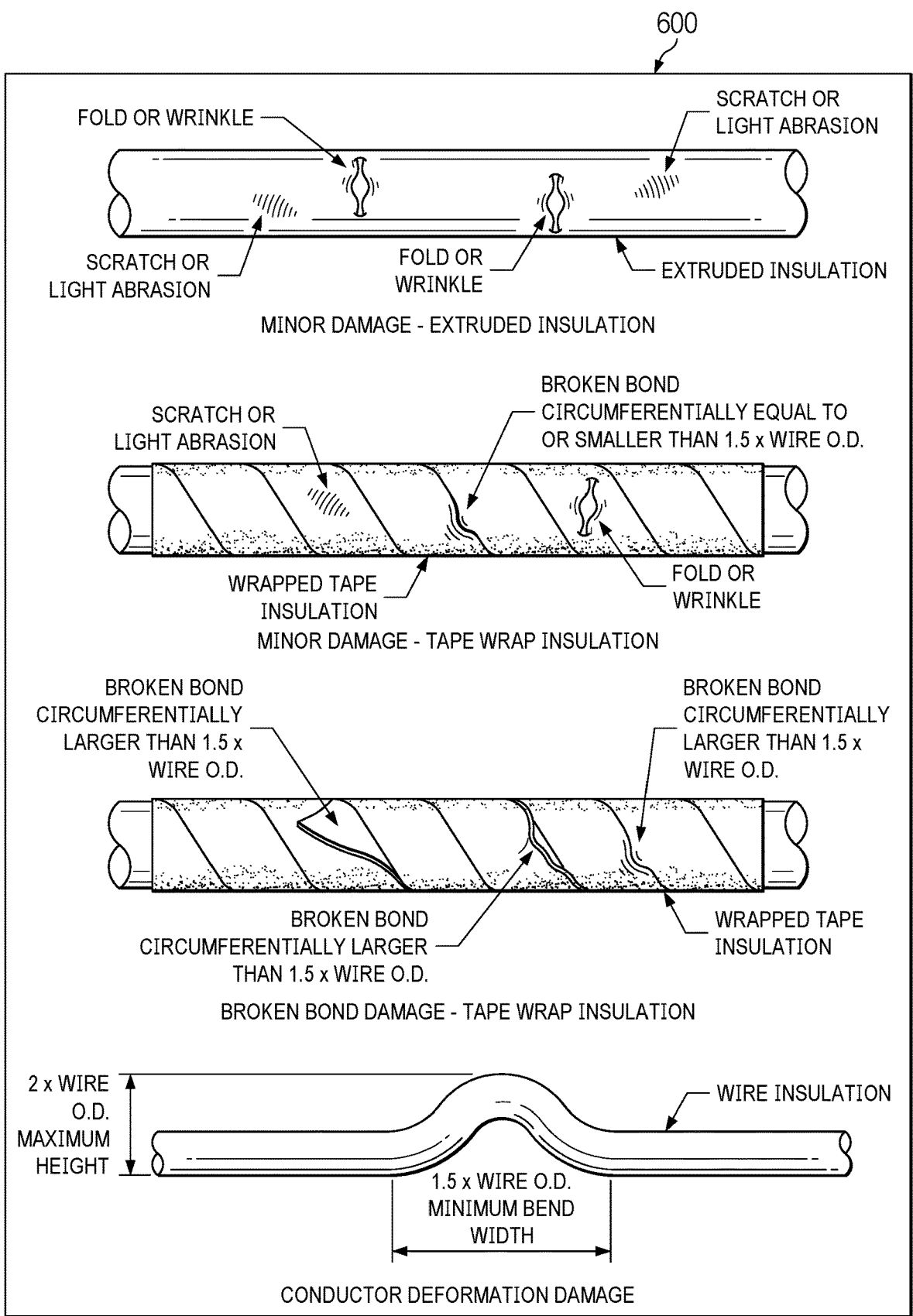
FIG. 6 is an illustration of wires and cables with anomalies in accordance with an illustrative embodiment.

With reference next to FIG. 6 and FIG. 7, illustrations of anomaly definitions are depicted in accordance with an illustrative embodiment. These two figures are examples of anomaly definitions 520 in FIG. 5.

In this illustrative example, FIG. 6 is an illustration of wires and cables with anomalies depicted in accordance with an illustrative embodiment. In this illustrative example, illustrations 600 are examples of anomalies that can be used with computer-aided design models to generate synthetic images. As depicted, illustrations 600 show in detail types of anomalies that can occur on wires and cables. These details in illustrations 600 show anomaly types can be used to generate images of anomalies using computer-aided design models.

With reference to FIG. 7, an illustration of a table wiring components and anomalies for wiring components are depicted with recommended dispositions in accordance with an illustrative embodiment. In this illustrative example, table 700 comprises columns in the form of wire component 702, anomaly condition 704, and recommended dispositions.

In another illustrative example, anomaly types can also be based on recommended dispositions 706. For example, anomaly type can be replacement, use as is, insulation repair, or some other type of classification. In other illustrative examples, anomaly types can be correlated with recommended dispositions 706 to indicate maintenance, rework, or no action that may be performed on a wiring harness.

In this illustrative example, anomaly condition 704 can be used as labels for classifying synthetic images using illustrations such as illustrations 600 in FIG. 6 with computer-aided design models. In another illustrative example, anomaly types can also be based on recommended dispositions 706. For example, anomaly type can be replacement, use as is, insulation repair, or some other type of classification. In other illustrative examples, anomaly types can be correlated with recommended dispositions 706 to indicate an action that that may be performed on a wiring harness.

Figure 8:
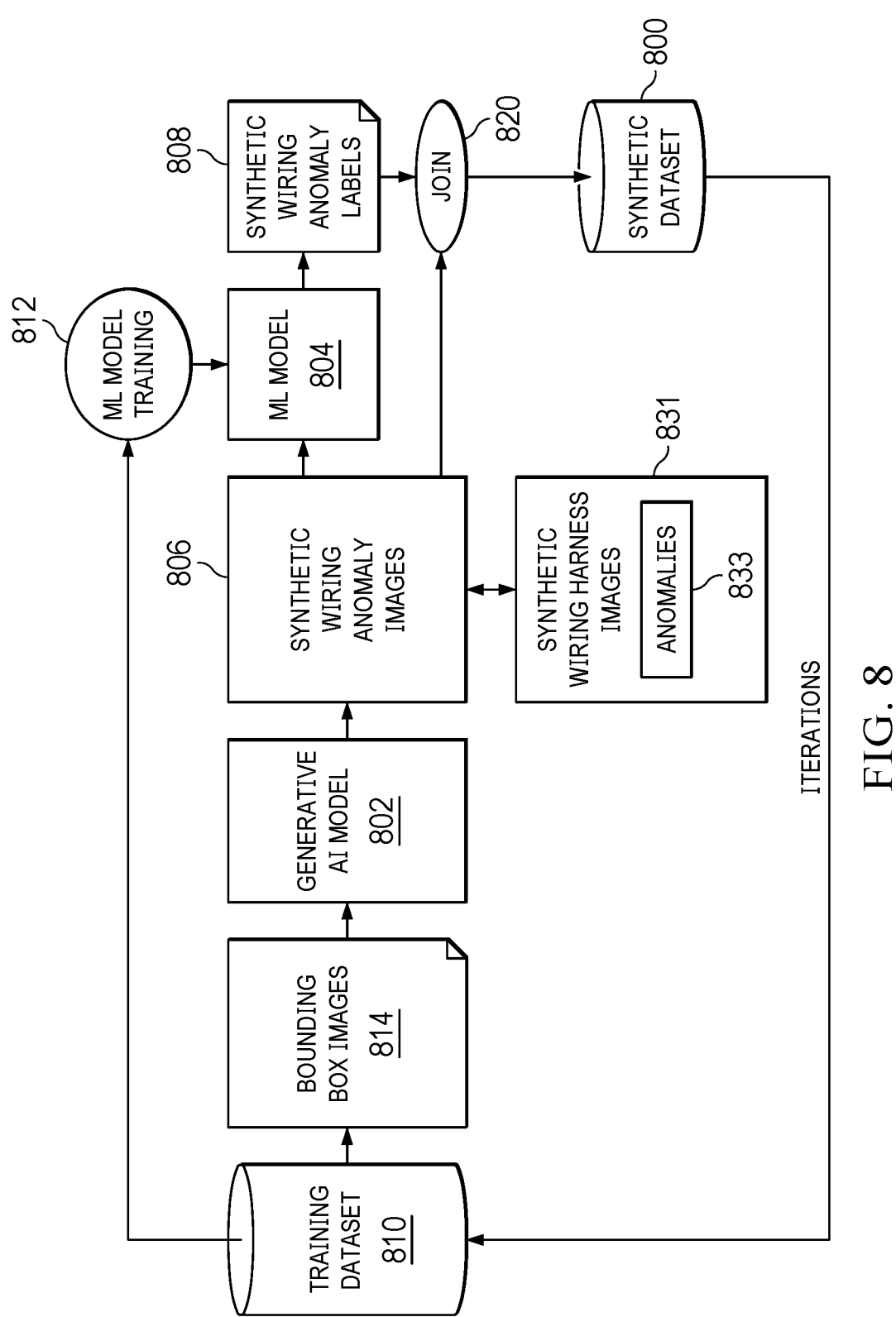
FIG. 8 is an illustration of a dataflow diagram for training machine learning model using a synthetic dataset in accordance with an illustrative embodiment.

Turning next to FIG. 8, an illustration of a dataflow diagram for training machine learning model using a synthetic dataset is depicted in accordance with an illustrative embodiment. In this illustrative example, synthetic dataset 800 is an example of synthetic data 510 in FIG. 5 with labels.

As depicted, training dataset 810 can be used in performing machine learning (ML) model training 812 to train machine learning model 804 to classify anomalies. In this example, the amount of training data in training dataset 810 can be increased by generating synthetic dataset 800 and adding those images in synthetic dataset 800 to training dataset 810. In this example, synthetic dataset 800 can be generated using generative artificial intelligence (AI) model 802 and machine learning (ML) model 804.

In this illustrative example, bounding box images 814 are images from within bounding boxes in training dataset 810. In these examples, bounding box images 814 are images containing anomalies.

In this illustrative example, training dataset 810 is an example of training dataset 506 in FIG. 5. As such, training dataset 810 can include images in the form of augmented data and synthetic data.

As depicted, generative AI model 802 generates synthetic wiring anomaly images 806 using bounding box images 814. In this example, synthetic wiring anomaly images 806 are synthetic wiring harness images 831 with anomalies 833.

Generative AI model 802 is a generative model from a generative adversarial network (GAN). Generative AI model 802 has been trained to generate synthetic wiring anomaly images 806. Generative AI model 802 has been trained in the statistical distribution of data and learn knowledge about the data to generate synthetic wiring anomaly images 806.

In this illustrative example, machine learning model 804 has been trained using training dataset 810 prior to beginning this dataflow. In this example, machine learning model 804 receives synthetic wiring anomaly images 806 as an input. Machine learning model 804 classifies these images to generate synthetic wiring anomaly labels 808. This classification involves detecting anomalies and classifying the anomalies in synthetic wiring anomaly images 806.

In this example, join 820 associates synthetic wiring anomaly labels in weight with synthetic wiring anomaly images 806 to create synthetic dataset 800.

In this example, synthetic dataset 800 is added to training dataset 810 to increase the amount of training data in training dataset 810. With the addition of synthetic dataset 800 to training dataset 810, machine learning model training 812 can be performed for machine learning model 804. This further training with increased data in training dataset 810 can increase the accuracy of machine learning model 804.

Numerous iterations of this process can be performed to increase the size of training dataset 810. In this example, synthetic wiring anomaly labels and weight can be checked to determine the accuracy of machine learning model 804. With analysis additional iterations of the process can be performed until satisfactory performance of machine learning model 804 occurs.

This dataflow in FIG. 8 illustrates one application of using a generative artificial intelligence model in which this model is used to create additional synthetic data in the form of synthetic wiring anomaly images 806. Generative artificial intelligence model 802 can be trained with an existing dataset to create additional synthetic data (features only). In this example, synthetic wiring anomaly labels 808 are identified by machine learning model 804 that has been already trained for object detection. Thus, the synthetic wiring anomaly images containing features in the form of anomalies and the labels can be joined together to create synthetic dataset 800 that is added to training dataset 810 to create a larger training dataset to train more accurate machine learning models.

Figure 9:
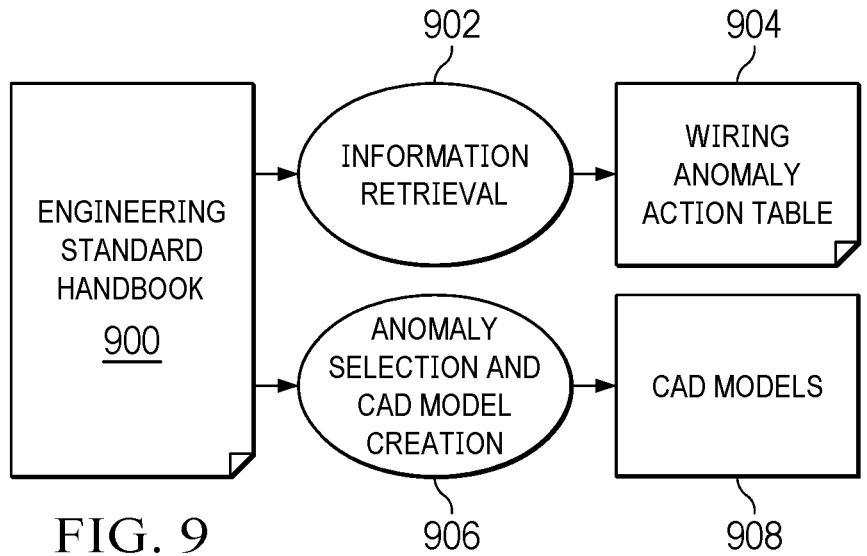
FIG. 9 is an illustration of a dataflow diagram using information from engineering standard handbooks to create computer-aided design models and actions for different anomalies in accordance with an illustrative embodiment.

With reference next to FIG. 9, an illustration of a dataflow diagram using information from engineering standard handbooks to create computer-aided design models and actions for different anomalies is depicted in accordance with an illustrative embodiment. In this illustrative example, engineering standard handbook 900 can be a handbook for wiring and cable anomaly identification and remedial actions. In this illustrative example, information retrieval 902 can be performed to retrieve information on actions to be taken based on different wiring anomalies. This information can be used to create wiring anomaly action table 904. This table can include information about actions to be taken with respect to wiring harnesses in which anomalies are identified. Further, anomaly selection and computer-aided design model creation 906 can be performed to create computer-aided design (CAD) models 908 containing anomalies. This creation of CAD models 908 can be performed using illustrations and descriptions of anomalies in engineering standard handbook 900.

Figure 10:
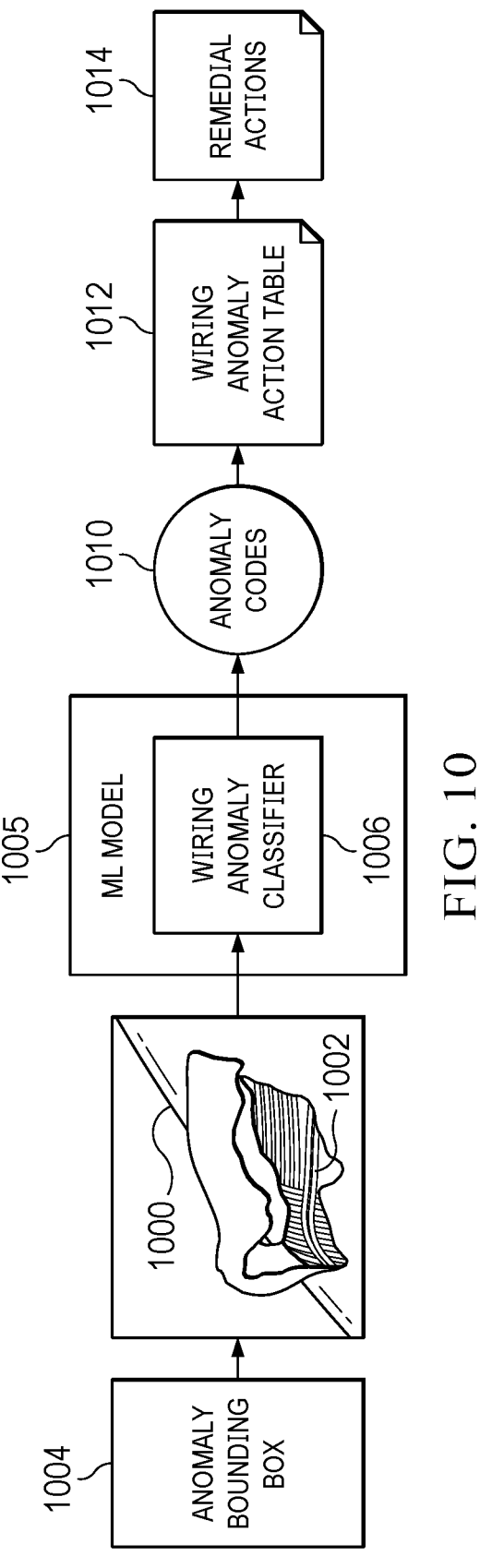
FIG. 10 is an illustration of a dataflow diagram for performing actions to rework wiring harnesses in accordance with an illustrative embodiment.

Turning next to FIG. 10, an illustration of a dataflow diagram for performing actions to rework wiring harnesses is depicted in accordance with an illustrative embodiment. In this illustrative example, image 1000 includes anomaly 1002 within bounding box 1004. This image is input into machine learning model 1005 that operates as wiring anomaly classifier 1006. In this example, machine learning (ML) model 1005 operating as wiring anomaly classifier 1006 is an example of machine learning model 500 operating as wiring anomaly classifier 502 in FIG. 5. This classifier can be trained using the same training dataset as depicted in FIG. 5.

In this illustrative example, machine learning model 1005 output anomaly codes 1010. These anomaly codes correspond to various classifications for anomalies. Anomaly codes 1010 can be text, numbers, alphanumeric strings, or take other forms.

In this illustrative example, anomaly codes 1010 can be used as an index into wiring anomaly action table 1012. This table is an example of wiring anomaly action table 904 created from engineering standard handbook 900 in FIG. 9. In this manner, an anomaly code can be used to identify an action in wiring anomaly action table 1012. Based on the identification, one or more remedial actions 1014 can be performed as rework for the wiring harness in which one or more anomalies have been identified. The remedial action in some cases can be maintenance, rework, or no action. In this manner, the machine learning models used with mobile personal inspection devices such as handheld scanners can be used to identify anomalies in actual physical wiring harnesses such that then a remedial action can be performed.

Figure 11:
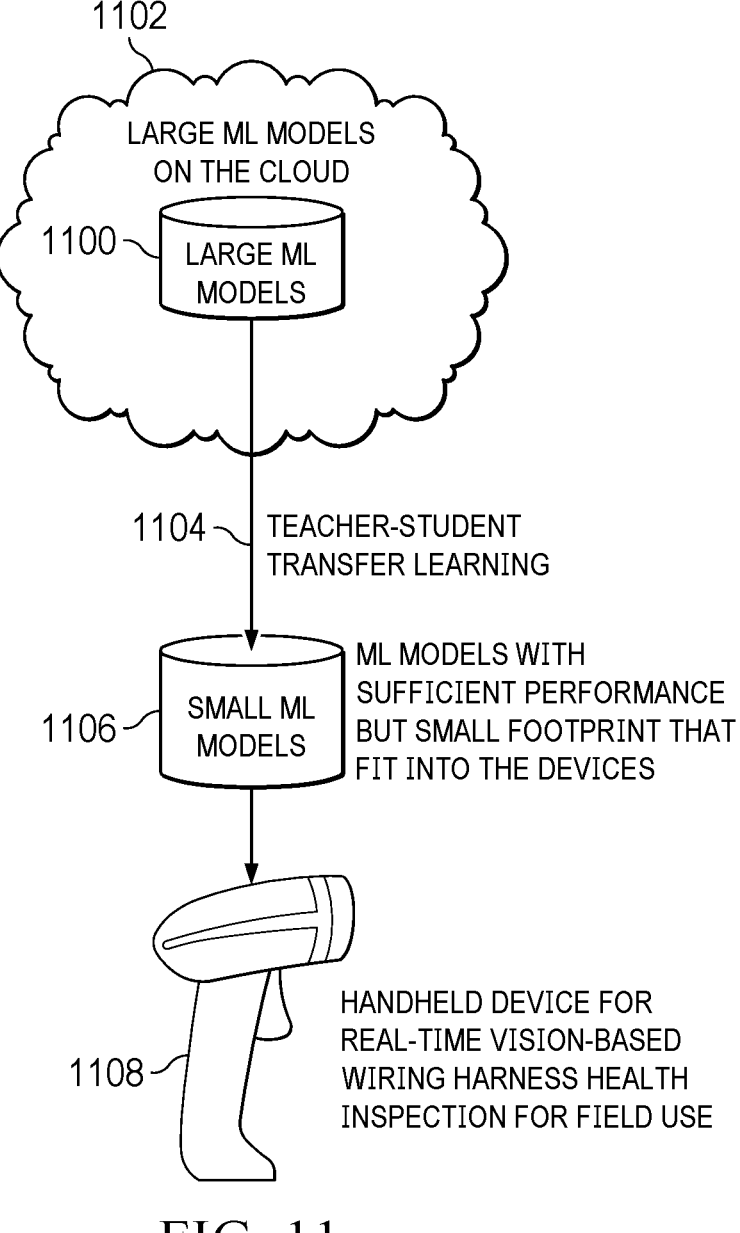
FIG. 11 is an illustration of a dataflow diagram for transfer learning of machine learning models for use in a handheld scanner in accordance with an illustrative embodiment.

With reference next to FIG. 11, an illustration of a dataflow diagram for transfer learning of machine learning models for use in a handheld scanner is depicted in accordance with an illustrative embodiment. In this illustrative example, large machine learning (ML) models 1100 are located in cloud 1102.

In this example, teacher-student transfer learning 1104 can be performed to create small machine learning (ML) models 1106 for use in handheld device 1108. This type of transfer learning creates a machine learning model with sufficient performance that can run in handheld device 1108 to perform real-time inspections that can include detecting anomalies and recommending remedial actions.

In this example, large ML models 1100 are machine learning models that have a size that cannot be run directly on handheld device 1108. Small ML models 1106 have a small enough footprint to run on handheld device 1108. Small machine learning models will have sufficient performance in detecting and classifying anomalies in wiring parts.

In this manner, handheld device 1108 can be used for real-time visual based wiring harness health inspection in the field. In this example, handheld device 1108 can be used as a stand-alone device without needing to send images back to large machine learning models 1100 in cloud 1102 for analysis.

In this manner, handheld device 1108 with one or more of small machine learning models 1106 have increased flexibility in performing wiring harness inspections. In this example, handheld device 1108 with a small machine learning model can perform real-time inspection, detection, and remedial action recommendation in the field under various conditions including those where a network or internet connection is unavailable.

Figure 12:
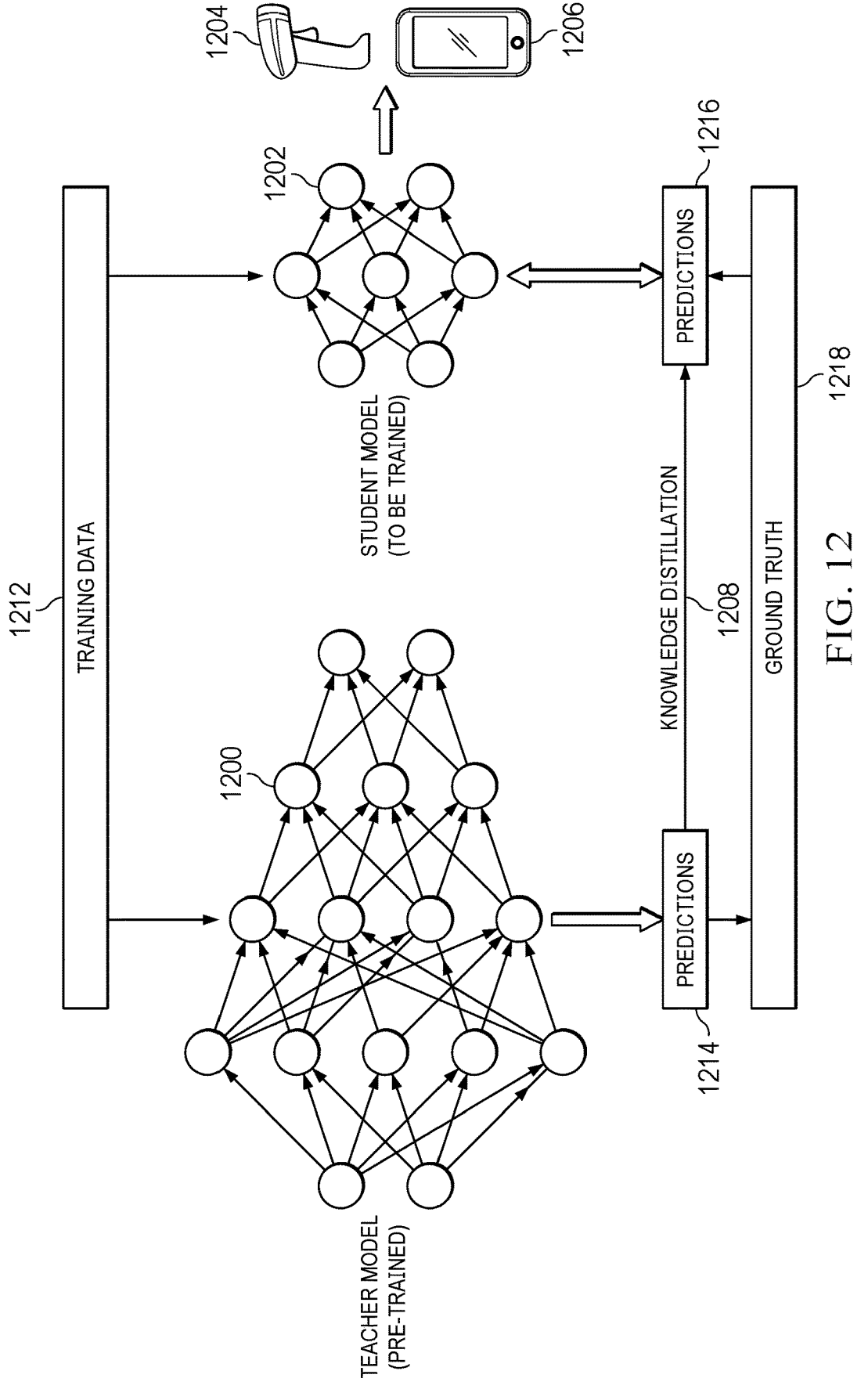
FIG. 12 is an illustration of teacher-student transfer learning in accordance with an illustrative embodiment.

Turning to FIG. 12, an illustration of teacher-student transfer learning is depicted in accordance with an illustrative embodiment. In this illustrative example, teacher model 1200 is a pre-trained model. This pretrained machine learning model has been trained to detect anomalies in wiring harnesses. The detection of anomalies can also include classifying anomalies and may also include recommending remedial actions to be taken based on the classification of the anomaly.

In this illustrative example, student model 1202 is a machine learning model that is to be trained by teacher model 1200. Student model 1202 has a smaller size than teacher model 1200. Student model 1202 as the size selected to run on mobile computing devices such as handheld scanner 1204 and mobile phone 1206.

In this example, the teacher-student transfer learning is also referred to as knowledge distillation 1208.

In this example, teacher model 1200 processes training data 1212 and generates predictions 1214. These predictions are considered soft labels using a softmax layer, which converts the output from teacher model 1200 into probabilities for predictions 1214.

In this example, student model 1202 processes training data 1212 to generate predictions 1216. In this example, student model 1202 learns to predict these softer probabilities in predictions 1214 rather than the original hard labels for training data 1212.

This process enables student model 1202 to learn from the more expressive knowledge in teacher model 1200. Further, this type of training enables student model 1202 to learn subtle patterns and relationships that normal labels use in training data 1212 may not convey.

In this example, predictions 1214 become ground truth 1218 that guides the student model 1202 during the training process. This type of training can provide a more informative and efficient transfer of knowledge and training student model 1202 to have desirable performance even though student model 1202 is smaller than teacher model 1200.

By leveraging the predictions 1214 from teacher model 1200, student model 1202 can benefit from learned representations and generalization capabilities of teacher model 1200. This type of knowledge transfer can enable student model 1202 to achieve comparable performance to teacher model 1200 even though student model 1202 is smaller in size. As result, knowledge distillation 1208 creates efficient machine learning models for deployment in resource-constrained environments such as in handheld scanner 1204 and mobile phone 1206.

Figure 13:
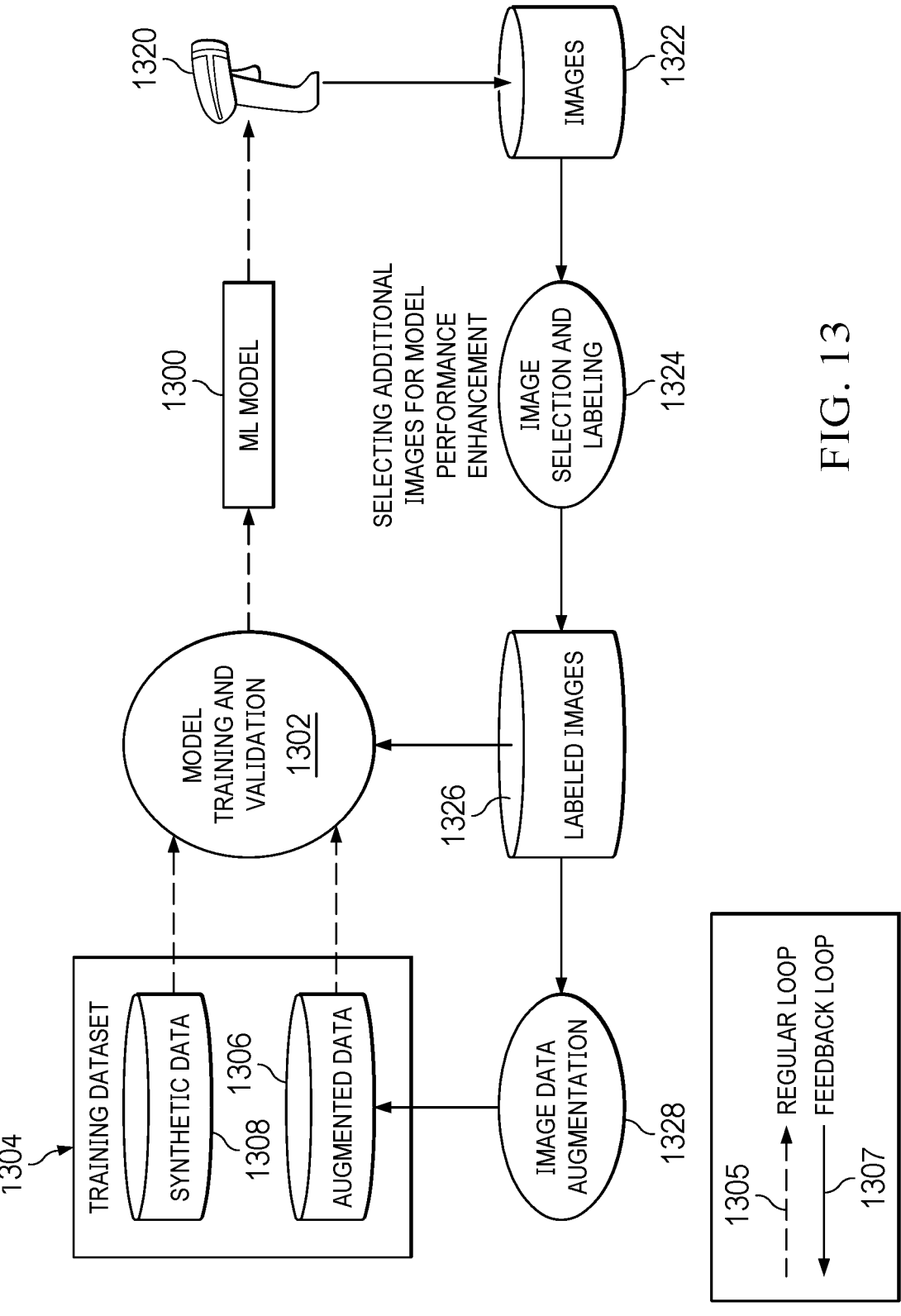
FIG. 13 is an illustration of a feedback loop for machine learning model performance enhancement in accordance with an illustrative embodiment.

With reference next to FIG. 13, an illustration of a feedback loop for machine learning model performance enhancement is depicted in accordance with an illustrative embodiment. In this illustrative example, machine learning model 1300 has been trained by model training and validation 1302 using training dataset 1304 in regular loop 1305. In this example, training dataset 1304 comprises augmented data 1306 and synthetic data 1308. In this example, training dataset 1304 with augmented data 1306 and synthetic data 1308 is an example of training dataset 506 with augmented data 508 and synthetic data 510 in FIG. 5.

In this example, feedback loop 1307 can be used to perform additional training of machine learning model 1300. In this example, handheld scanner 1320 generates images. These images can be stored with images 1322 generated by handheld scanner 1320 as well as other handheld scanners or mobile personal scanning devices. In this example, image selection and labeling 1324 can be performed for images 1322. In this example, images 1322 can be for a particular aircraft fleet. In other words, images 1322 can be an aircraft fleet selected from a group comprising from a group comprising all aircraft operated by an organization, the aircraft of a same type, the aircraft on a same route, the aircraft with a same cabin configuration, the aircraft within an age range, or other groupings of aircraft.

In this example, images selected from images 1322 can be images that can provide additional model performance enhancement for machine learning model 1300. For example, the selection of images from images 1322 can include images of anomalies that show up for a particular fleet of aircraft for which scanning is performed by handheld scanner 1320 and mobile personal computing devices. Over time, images 1322 can be for wiring harnesses with anomalies in different areas of the aircraft in the fleet. In other words, wiring harnesses in some areas of an aircraft may have more anomalies over time than wiring harnesses in other areas. Further, particular types of anomalies may show up more often over time that are specific to a fleet of aircraft.

By selecting these images, machine learning model 1300 can be trained to better detect those areas in the fleet of aircraft for which handheld scanner 1320 is used.

In this example, the selected images from images 1322 are labeled by image selection and labeling 1324 to form labeled images 1326. In this example, labeled images 1326 can be processed by image data augmentation 1328 to generate augmented images for augmented data 1306. In this manner, new data can be added to training dataset 1304 or used in training machine learning model 1300. Further, labeled images 1326 can also be used by model training and validation 1302 along with training dataset 1304 to train further machine learning model 1300.

The illustration of this feedback loop is an example of one manner in which a machine learning model can be iteratively or continuously trained to improve performance. This illustration is not meant to limit the manner in which other illustrative examples can be implemented. For example, labeled images 1326 can be considered part of training dataset 1304 in some illustrative examples.

Figure 14:
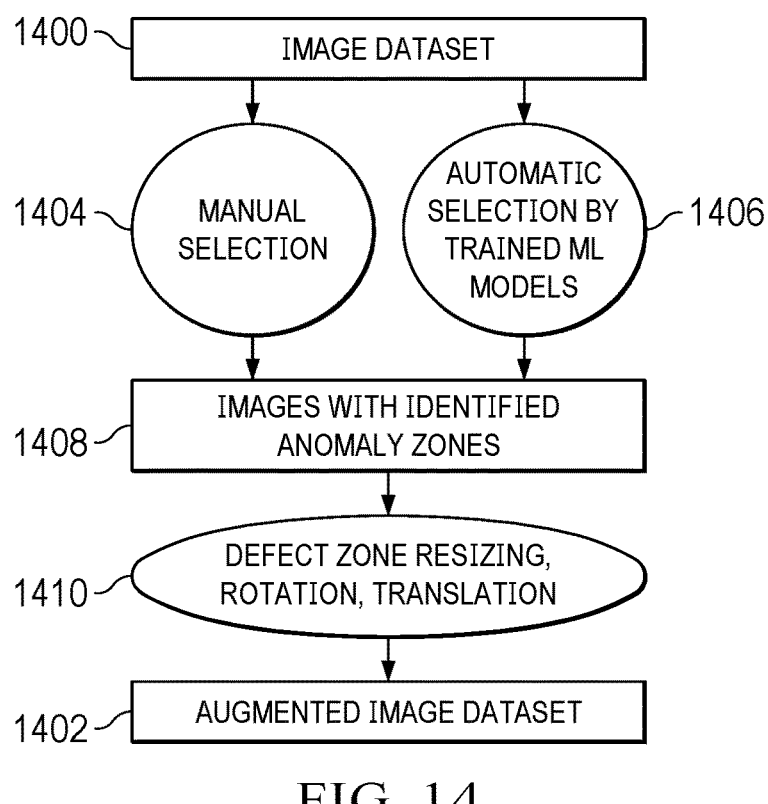
FIG. 14 is an illustration of a data flow diagram for image augmentation in accordance with an illustrative embodiment.

With reference now to FIG. 14, an illustration of a data flow diagram for image augmentation is depicted in accordance with an illustrative embodiment. In this illustrative example, image dataset 1400 can be processed in a number of different ways to generate image dataset 1400 and augmented image dataset 1402.

For example, images from image dataset 1400 can be selected using manual selection 1404 or automatic selection by train machine learning (ML) models 1406. In this example, the selected images are images with identified anomaly zones 1408, that can be augmented to create additional images for training data.

In this example, defect zone resizing, rotation, and translation 1410 can be performed upon the images selected for augmentation. At least one of these types of changes to the images or any combination of these changes can be used to create augmented images for augmented image dataset 1402. These images in augmented image dataset 1402 can be examples of augmented data 508 in FIG. 5.

Figure 15:
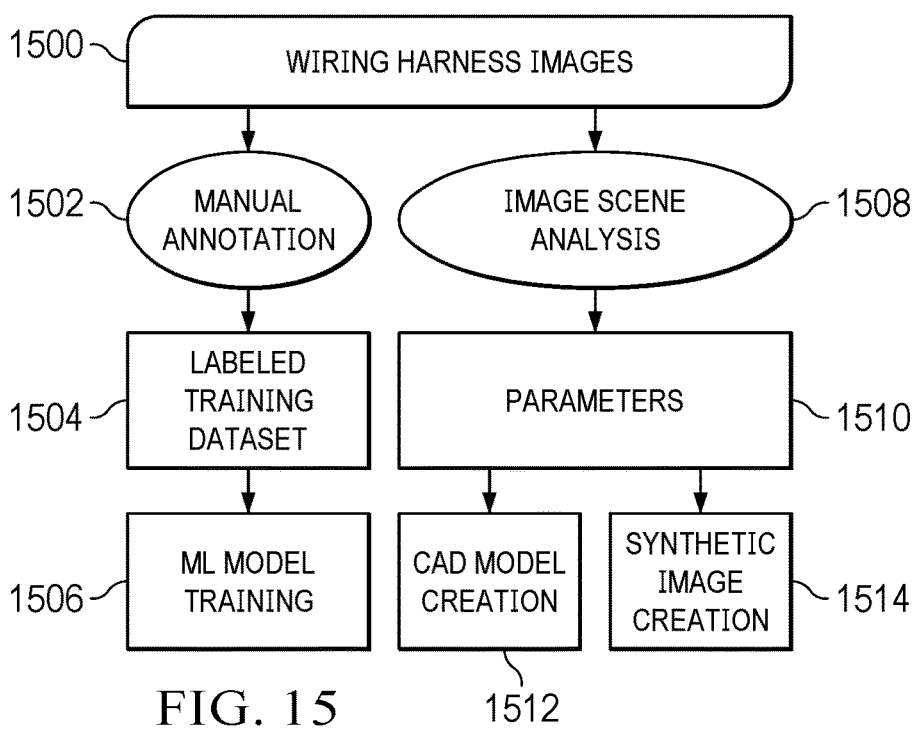
FIG. 15 is an illustration of a data flow diagram for labeling and parameter extraction in accordance with an illustrative embodiment.

With reference next to FIG. 15, an illustration of a data flow diagram for labeling and parameter extraction is depicted in accordance with an illustrative embodiment. In this illustrative example, wiring harness images 1500 are images captured by a camera. In this depicted example, manual annotation 1502 can be performed on wiring harness images to form labeled training dataset 1504 for use in machine learning (ML) model training 1506.

Further in this example, image scene analysis 1508 can be performed on wiring harness images 1500 to obtain parameters 1510 for wiring harness images 1500. Parameters 1510 can be at least one of geometry or material of objects in the image. This analysis can be performed using an artificial intelligence model.

In this example, these parameters can be used in computer-aided design (CAD) model creation 1512 or synthetic image creation 1514 using generative artificial intelligence models.

Next in FIG. 16, an illustration of a data flow diagram for synthetic image generation is depicted in accordance with an illustrative embodiment. In this example, generative artificial intelligence model 1600 is an example of an artificial intelligence model that can be used to generate parameters 1602 for use in creating images for synthetic data.

In this example, parameters 1602 such as the geometry and material of objects in the image and the detail information of the wiring defects such as types, sizes, or orientations are input into generative AI model 1600 with the output parameter being added to parameters 1602 to create a larger set of parameters 1602.

In this example, generative AI model 1600 learns the statistical distribution of the parameters. Statistical distribution can be used to expand the training dataset by creating a larger parameter set with similar or same statistical distribution. As a result, the resulting larger training dataset can help to improve the accuracy of the trained machine learning models. In this example, the larger training dataset takes the form of labeled synthetic images 1606.

In this example, parameters 1602 can be used as inputs into computer-aided design (CAD) software 1603 to at least one of create or modify computer-aided design models 1604. In this example, snapshots 1608 can be created from computer aided design models 1604. In this example, snapshots 1608 can be taken from computer aided design models 1604 at different angles, at different distances, with different lighting conditions, or by simulating various camera settings. Since the images are created from scenes with known wiring anomaly conditions, labels can be automatically added to snapshots 1608 of created images without additional processing or manual data labeling to generate labeled synthetic images 1606.

In this example, labeled synthetic images 1606 can be images with or without wiring anomalies. These images can be labeled to indicate whether anomalies are present. Also, labels can be added for the type of anomaly. Thus, generative artificial intelligence models can be used to increase the size of training datasets through creating parameters 1602 based on statistical distributions and by creating synthetic wiring anomaly images.

Turning next to FIG. 17, an illustration of a flowchart of a process for inspecting a wiring harness in an aerospace vehicle is depicted in accordance with an illustrative embodiment. The process in FIG. 17 can be implemented in hardware, software, or both. When implemented in software, the process can take the form of program instructions that are run by one of more processor units located in one or more hardware devices in one or more computer systems. For example, the process can be implemented in inspection manager 214 in computer system 212 in FIG. 2.

The process begins by controlling a camera system to generate a set of images of the wiring harness in the aerospace vehicle, wherein the camera system is connected to the mobile personal computing device (operation 1700). The process sends the set of images of the wiring harness to a machine learning model, wherein the machine learning model is trained to detect anomalies in a set of images of a wiring harness in an aerospace vehicle (operation 1702).

The process receives a result from the machine learning model indicating whether an anomaly is present in the wiring harness in the aerospace vehicle (operation 1704). The process terminates thereafter.

With reference now to FIG. 18, an illustration of a flowchart of a process for creating training data is depicted in accordance with an illustrative embodiment. The training data in this example can be used to train machine learning models to be more specific in identifying anomalies in a particular fleet of aircraft. The process in this example is an example of additional operations that can be performed with the operations in FIG. 17.

The process begins by storing images captured by a set of mobile personal computing devices in which storing the images captured from a set of mobile personal computing devices forms stored images (operation 1800). The process stores classifications of the anomalies identified in the images by the set of mobile personal computing devices in association with the stored images (operation 1802).

The process selects images from the stored images in which selecting the images forms selected images (operation 1804). Next, the process labels the selected images with labels based on the classification of the anomalies for the selected images (operation 1806).

The process performs additional training of the machine learning model using the selected images with the labels (operation 1808). The process terminates thereafter.

Thus, these images can be used to train the machine learning model over time to identify anomalies for a specific fleet of aircraft. This process uses a feedback loop that can be performed periodically or continuously. The images can be for an aircraft fleet operated by an organization in which the additional training of the machine learning model increases the accuracy of the machine learning model in detecting anomalies for the aircraft fleet. The organization can be selected from a group comprising an airline, a government, and an aircraft manufacturer.

With reference to FIG. 19, an illustration of a flowchart of process for selecting images is depicted in accordance with an illustrative embodiment. The process depicted in this flowchart is an example of an implementation for operation 1804 in FIG. 18.

The process selects images having anomalies identified in an aircraft fleet in which selecting the images forms selected images, wherein the additional training of the machine learning model results in the machine learning model having increased accuracy in detecting anomalies in the wiring harnesses for the aircraft fleet (operation 1900). The process terminates thereafter. The selection of images for anomalies in an aircraft fleet can result in the machine learning model becoming fleet specific for an airline or other organization. In one illustrative example, the aircraft fleet can be selected from a group comprising all aircraft operated by an organization, the aircraft of a same type, the aircraft on a same route, the aircraft with a same cabin configuration, or the aircraft within an age range.

Figure 20:
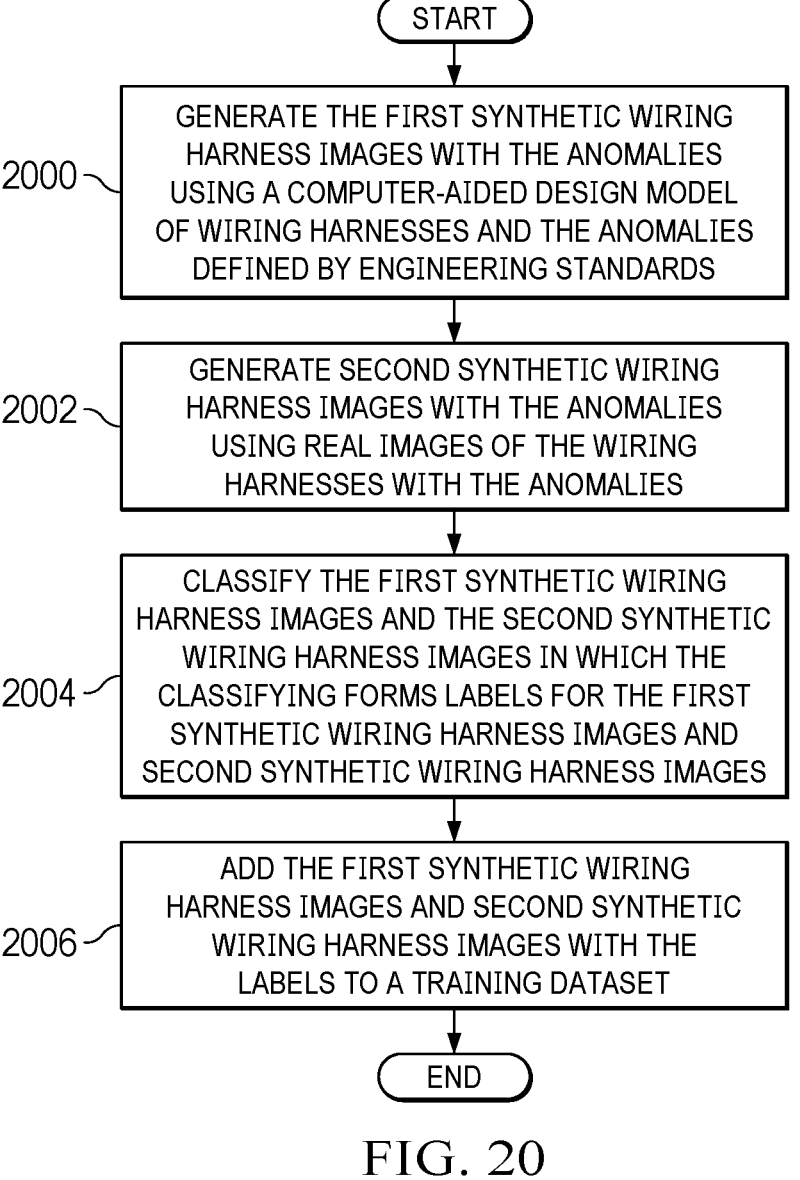
FIG. 20 is an illustration of a flowchart of a process for generating training data in accordance with an illustrative embodiment.

Turning now to FIG. 20, an illustration of a flowchart of a process for generating training data is depicted in accordance with an illustrative embodiment. The process illustrated in this figure is an example of additional operations that can be performed with the operations in FIG. 17. This process can be used to generate synthetic data from computer-aided design models and real images of wiring harnesses.

The process begins by generating the first synthetic wiring harness images with the anomalies using a computer-aided design model of wiring harnesses and the anomalies defined by engineering standards (operation 2000). The process generates second synthetic wiring harness images with the anomalies using real images of the wiring harnesses with the anomalies (operation 2002).

The process classifies the first synthetic wiring harness images and the second synthetic wiring harness images in which the classifying forms labels for the first synthetic wiring harness images and second synthetic wiring harness images (operation 2004). The process adds the first synthetic wiring harness images and second synthetic wiring harness images with the labels to a training dataset (operation 2006). The process terminates thereafter.

Next in FIG. 21, an illustration of a flowchart of a process for generating training data is depicted in accordance with an illustrative embodiment. The process illustrated in this figure is an example of additional operations that can be performed with the operations in FIG. 17.

The process begins by creating synthetic wiring harness images using a second machine learning model trained to generate synthetic wiring harness images from wiring harness images in training dataset (operation 2100). The process determines whether the synthetic wiring harness images have the anomalies (operation 2102). The process adds labels to the synthetic wiring harness images to indicate whether the anomalies are present (operation 2104). In this example, the synthetic wiring harness images with the anomalies are synthetic wiring anomaly images;

The process stores the synthetic wiring harness images with the labels to create a synthetic training dataset (operation 2106). The process terminates thereafter.

In this depicted example, the second machine learning model can be a generative artificial intelligence model. This model can be previously trained in a generative adversarial network to create synthetic wiring harness images using wiring harness images.

Figure 22:
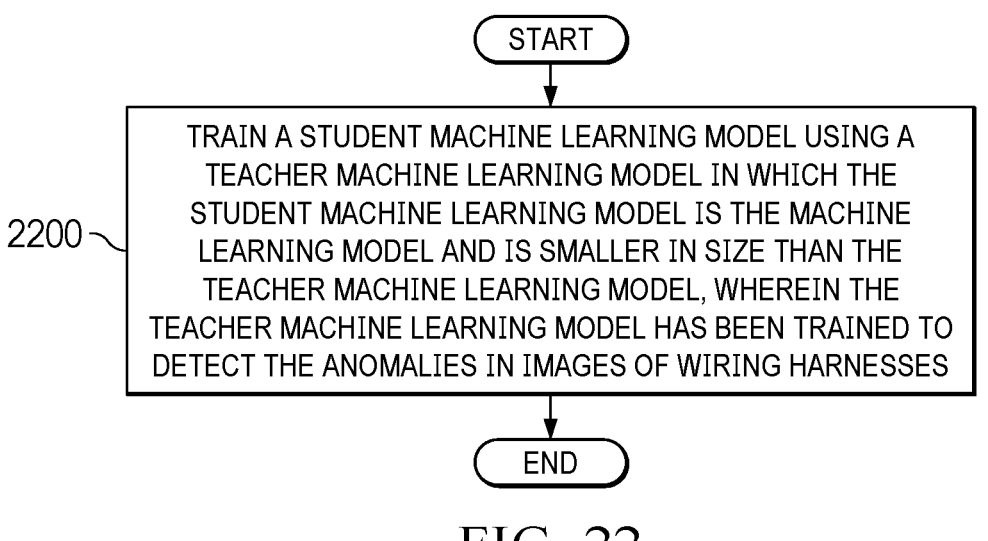
FIG. 22 is an illustration of a flowchart of a process for training a machine learning model for use in a mobile personal computing device in accordance with an illustrative embodiment.

In FIG. 22, an illustration of a flowchart of a process for training a machine learning model for use in a mobile personal computing device is depicted in accordance with an illustrative embodiment. In this illustrative example, the mobile personal computing device may have limited computing resources as compared to a workstation or server computer.

The process trains a student machine learning model using a teacher machine learning model in which the student machine learning model is the machine learning model and is smaller in size than the teacher machine learning model, wherein the teacher machine learning model has been trained to detect the anomalies in images of wiring harnesses (operation 2200). The process terminates thereafter.

Figure 23:
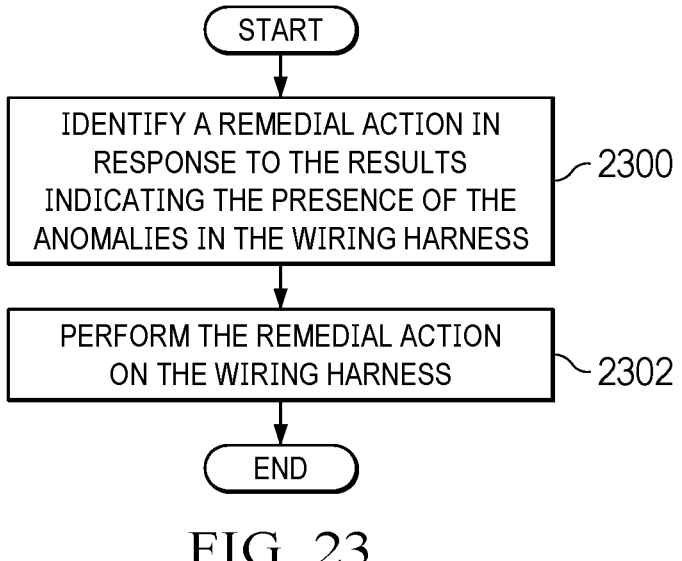
FIG. 23 is an illustration of a flowchart of a process for performing a remedial action in accordance with an illustrative embodiment.

Turning now to FIG. 23, an illustration of a flowchart of a process for performing a remedial action is depicted in accordance with an illustrative embodiment. The process illustrated in this figure is an example of an additional operation that can be performed with the operations in FIG. 17.

The process begins by identifying a remedial action in response to the results indicating the presence of the anomalies in the wiring harness (operation 2300). In operation 2300, the remedial action can be identified in a number of different ways. For example, the machine learning model can include remedial action. As result, the remedial actions be identified from result returns from the machine learning model.

In another illustrative example, the indication of the anomaly in the result can also include a classification of the anomaly. This classification can be used to identify the remedial action.

In some cases, the classification may be based on classifications in anomaly definitions from handbooks for wire and cable damage and repairs and may include anomaly codes that can be used to identify remedial actions. With the use of anomaly codes identified from anomaly definitions in engineering standard handbooks, the remedial action can be determined based on information from those engineering standard handbooks.

The process performs the remedial action on the wiring harness (operation 2302). The process terminates thereafter. In operation 2302, remedial action is performed on the actual physical wiring harness in the aerospace vehicle. The remedial action can be, for example, maintenance, replacement, logging the anomaly, or some other suitable action.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
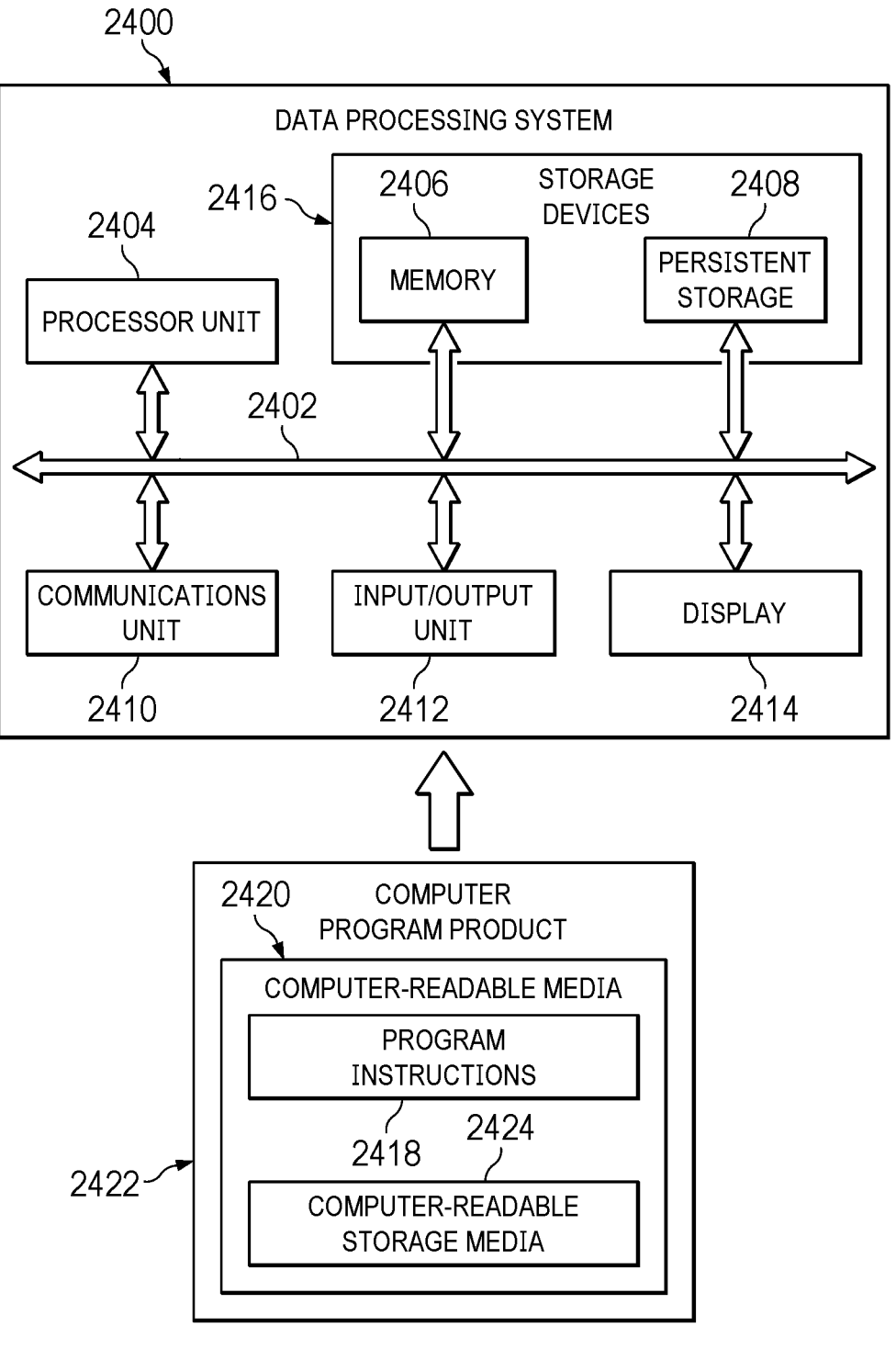
FIG. 24 is an illustration of a block diagram of a data processing system in accordance with an illustrative embodiment.

Turning now to FIG. 24, a block diagram of a data processing system is depicted in accordance with an illustrative embodiment. Data processing system 2400 can be used to implement server computer 104, server computer 106, or client devices 110 in FIG. 1. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 takes the form of a bus system.

Processor unit 2404 serves to execute instructions for software that can be loaded into memory 2406. Processor unit 2404 includes one or more processors. For example, processor unit 2404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2404 can be implemented using one or more heterogeneous processor systems in which a main processor is present with secondary processors on a single chip. As another illustrative example, processor unit 2404 can be a symmetric multi-processor system containing multiple processors of the same type on a single chip.

Memory 2406 and persistent storage 2408 are examples of storage devices 2416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2416 may also be referred to as computer readable storage devices in these illustrative examples. Memory 2406, in these examples, can be, for example, a random-access memory or any other suitable volatile or non-volatile storage device. Persistent storage 2408 may take various forms, depending on the particular implementation.

For example, persistent storage 2408 may contain one or more components or devices. For example, persistent storage 2408 can be a hard drive, a solid-state drive (SSD), a flash memory, a rewritable optical disk, a rewritable magnetic tape, or some combination of the above. The media used by persistent storage 2408 also can be removable. For example, a removable hard drive can be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that can be connected to data processing system 2400. For example, input/output unit 2412 may provide a connection for user input through at least one of a keyboard, a mouse, or some other suitable input device. Further, input/output unit 2412 may send output to a printer. Display 2414 provides a mechanism to display information to a user.

Instructions for at least one of the operating system, applications, or programs can be located in storage devices 2416, which are in communication with processor unit 2404 through communications framework 2402. The processes of the different embodiments can be performed by processor unit 2404 using computer-implemented instructions, which may be located in a memory, such as memory 2406.

These instructions are referred to as program instructions, computer usable program instructions, or computer readable program instructions that can be read and executed by a processor in processor unit 2404. The program instructions in the different embodiments can be embodied on different physical or computer readable storage media, such as memory 2406 or persistent storage 2108.

Program instructions 2418 are located in a functional form on computer readable media 2420 that is selectively removable and can be loaded onto or transferred to data processing system 2400 for execution by processor unit 2404. Program instructions 2418 and computer readable media 2420 form computer program product 2422 in these illustrative examples. In the illustrative example, computer readable media 2420 is computer readable storage media 2424.

Computer readable storage media 2424 is a physical or tangible storage device used to store program instructions 2418 rather than a medium that propagates or transmits program instructions 2418. Computer readable storage media 2424 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 2424, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 2418 can be transferred to data processing system 2400 using a computer readable signal media. The computer readable signal media are signals and can be, for example, a propagated data signal containing program instructions 2418. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 2420" can be singular or plural. For example, program instructions 2418 can be located in computer readable media 2420 in the form of a single storage device or system. In another example, program instructions 2418 can be located in computer readable media 2420 that is distributed in multiple data processing systems. In other words, some instructions in program instructions 2418 can be located in one data processing system while other instructions in program instructions 2418 can be located in one data processing system. For example, a portion of program instructions 2118 can be located in computer readable media 2420 in a server computer while another portion of program instructions 2418 can be located in computer readable media 2420 located in a set of client computers.

The different components illustrated for data processing system 2400 are not meant to provide architectural limitations to the manner in which different embodiments can be implemented. In some illustrative examples, one or more of the components may be incorporated in, or otherwise form a portion of, another component. For example, memory 2406, or portions thereof, may be incorporated in processor unit 2404 in some illustrative examples. The different illustrative embodiments can be implemented in a data processing system including components in addition to or in place of those illustrated for data processing system 2400. Other components shown in FIG. 24 can be varied from the illustrative examples shown. The different embodiments can be implemented using any hardware device or system capable of running program instructions 2418.

Figures 25, 26:
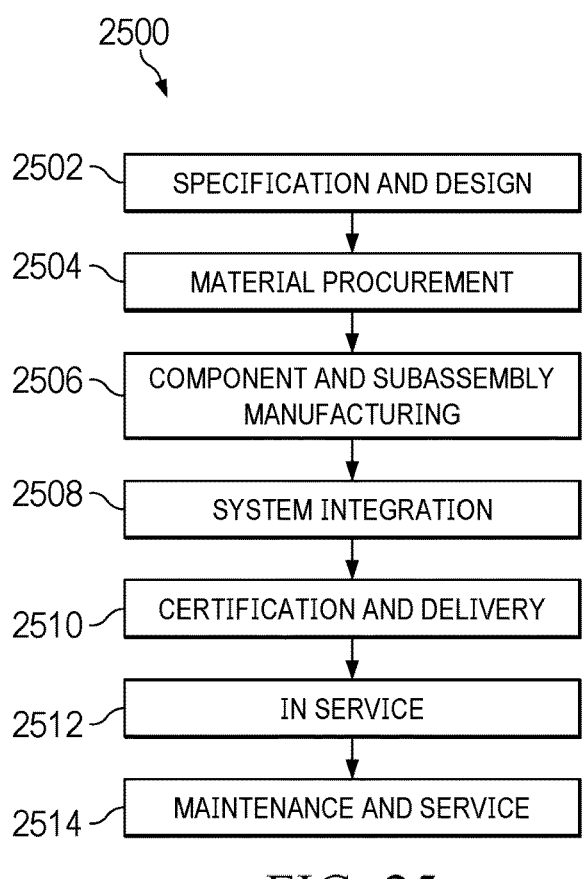
FIG. 25 is an illustration of an aircraft manufacturing and service method in accordance with an illustrative embodiment.
FIG. 26 is an illustration of a block diagram of an aircraft in which an illustrative embodiment may be implemented.

Illustrative embodiments of the disclosure may be described in the context of aircraft manufacturing and service method 2500 as shown in FIG. 25 and aircraft 2600 as shown in FIG. 26. Turning first to FIG. 25, an illustration of an aircraft manufacturing and service method is depicted in accordance with an illustrative embodiment. During preproduction, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 can go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft is depicted in which an illustrative embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25.

In one illustrative example, components or subassemblies produced in component and subassembly manufacturing 2506 in FIG. 25 can be fabricated or manufactured in a manner similar to components or subassemblies produced while aircraft 2600 is in service 2512 in FIG. 25. As yet another example, one or more apparatus embodiments, method embodiments, or a combination thereof can be utilized during production stages, such as component and subassembly manufacturing 2506 and system integration 2508 in FIG. 25. One or more apparatus embodiments, method embodiments, or a combination thereof may be utilized while aircraft 2600 is in service 2512, during maintenance and service 2514 in FIG. 25, or both. The use of a number of the different illustrative embodiments may substantially expedite the assembly of aircraft 2600, reduce the cost of aircraft 2600, or both expedite the assembly of aircraft 2600 and reduce the cost of aircraft 2600.

For example, wiring harness inspection system 202 in FIG. 2 can be used during at least one of component and subassembly manufacturing 2506 or system integration 2508 to inspect wiring harnesses as the harnesses are manufactured and integrated into aircraft 2600. In another example, this wiring harness inspection system can also be used during maintenance and service 2514 to inspect wiring harnesses. Maintenance and service 2514 can be routine maintenance and service, which may include modification, reconfiguration, refurbishment, and other maintenance or service.

Some features of the illustrative examples are described in the following clauses. These clauses are examples of features and are not intended to limit other illustrative examples.

Clause 1

An aerospace wiring harness inspection system comprising:

a mobile personal computing device;

a camera system connected to the mobile personal computing device;

a machine learning model running in the mobile personal computing device, wherein the machine learning model is trained to detect anomalies in a set of images of a wiring harness in an aerospace vehicle; and an inspection manager configured to:

control the camera system to generate a set of images of the wiring harness;

send the set of images of the wiring harness to the machine learning model; and receive a result from the machine learning model indicating whether an anomaly is present in the wiring harness.

Clause 2

The aerospace wiring harness inspection system according to clause 1 further comprising:

a computer system configured to:

store images captured by a set of mobile personal computing devices in which storing the images captured from a set of mobile personal computing devices forms stored images;

store classifications of the anomalies identified in the images by the set of mobile personal computing devices in association with the stored images;

select images from the stored images in which selecting the images forms selected images;

label the selected images with labels based on the classifications of the anomalies for the selected images; and perform additional training of the machine learning model using the selected images with the labels.

Clause 3

The aerospace wiring harness inspection system according to clause 2, where the images are for an aircraft fleet operated by an organization, wherein the additional training of the machine learning model increases an accuracy of the machine learning model in detecting the anomalies for the aircraft fleet.

Clause 4

The aerospace wiring harness inspection system according to clause 3, wherein the organization is selected from a group comprising an airline, a government, and an aircraft manufacturer.

Clause 5

5. The aerospace wiring harness inspection system according one of clauses 1 or 2, wherein in selecting the images, the computer system is configured to:

select images having the anomalies identified in an aircraft fleet in which selecting the images forms selected images, wherein the additional training of the machine learning model results in the machine learning model having increased accuracy in detecting the anomalies in wiring harnesses for the aircraft fleet.

Clause 6

The aerospace wiring harness inspection system according to clause 5, wherein the aircraft fleet is selected from a group comprising all aircraft operated by an organization, the aircraft of a same type, the aircraft on a same route, the aircraft with a same cabin configuration, or the aircraft within an age range.

Clause 7

The aerospace wiring harness inspection system according one of clauses 1, 2, 3, 4, 5, or 6 further comprising:

a computer system configured to:

generate first synthetic wiring harness images with the anomalies using computer-aided design models of wiring harnesses and the anomalies defined by engineering standards;

generate second synthetic wiring harness images with the anomalies using real images of the wiring harnesses with the anomalies;

classify the first synthetic wiring harness images and the second synthetic wiring harness images in which classifying forms labels for the first synthetic wiring harness images and the second synthetic wiring harness images;

add the first synthetic wiring harness images and the second synthetic wiring harness images with the labels to a training dataset; and train the machine learning model using the synthetic training dataset.

Clause 8

The aerospace wiring harness inspection system according to one of clauses 1, 2, 3, 4, 5, 6, or 7 further comprising:

a computer system configured to:

create synthetic wiring harness images using a second machine learning model trained to generate the synthetic wiring harness images from wiring harness images in training dataset;

determine whether the synthetic wiring harness images have the anomalies;

add labels to the synthetic wiring harness images to indicate whether the anomalies are present, wherein the synthetic wiring harness images with the anomalies are synthetic wiring anomaly images;

store the synthetic wiring harness images with the labels to create a synthetic training dataset; and train the machine learning model using the synthetic training dataset.

Clause 9

The aerospace wiring harness inspection system according to clause 8, wherein the second machine learning model is a generative artificial intelligence model trained in a generative adversarial network to create the synthetic wiring harness images using wiring harness images.

Clause 10

The aerospace wiring harness inspection system of according to one of clauses 1, 2, 3, 4, 5, 6, 7, 8, or 9 comprising:

a teacher machine learning model that has been trained to detect the anomalies in the images of wiring harnesses; and a computer system configured to:

train a student machine learning model using the teacher machine learning model in which the student machine learning model is the machine learning model and is smaller in size than the teacher machine learning model.

Clause 11

The aerospace wiring harness inspection system according to one of clauses 1, 2, 3, 4, 5, 6, 7, 8, 9, or 10, wherein the mobile personal computing device is selected from a group comprising an extension rod, a handheld scanner, a smart phone, a mobile phone, a tablet, smart glasses, augmented reality goggles, a laptop computer, and a smart watch.

Clause 12

The aerospace wiring harness inspection system according to one of clauses 1, 2, 3, 4, 5, 6, 7, 8, 9, 10, or 11, wherein the aerospace vehicle is selected from a group comprising an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a spacecraft, a jet aircraft, and a space shuttle.

Clause 13

A platform wiring inspection system comprising:

a mobile personal computing device;

a camera system connected to the mobile personal computing device;

a machine learning model running in the mobile personal computing device, wherein the machine learning model is trained to detect anomalies in images of wiring harnesses for a platform; and an inspection manager configured to:

control the camera system to generate a set of images of a wiring harness;

send the set of images of the wiring harness to the machine learning model; and receive a result from the machine learning model indicating whether an anomaly is present in the wiring harness.

Clause 14

The platform wiring inspection system according to clause 13, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 15

A method for inspecting a wiring harness in an aerospace vehicle, the method comprising:

controlling, by a computer system, a camera system to generate a set of images of the wiring harness in the aerospace vehicle, wherein the camera system is connected to a mobile personal computing device;

sending, by the computer system, the set of images of the wiring harness to a machine learning model, wherein the machine learning model is trained to detect anomalies in a set of images of the wiring harness in the aerospace vehicle; and receiving, by the computer system, a result from the machine learning model indicating whether an anomaly is present in the wiring harness in the aerospace vehicle.

Clause 16

The method of according to clause 15 further comprising:

storing, by the computer system, images captured by a set of mobile personal computing devices in which storing the images captured from a set of mobile personal computing devices forms stored images;

storing, by the computer system, classifications of the anomalies identified in the images by the set of mobile personal computing devices in association with the stored images;

selecting, by the computer system, images from the stored images in which selecting the images forms selected images;

labeling, by the computer system, the selected images with labels based on the classifications of the anomalies for the selected images; and performing, by the computer system, additional training of the machine learning model using the selected images with the labels.

Clause 17

The method according to clause 16, wherein the images are for an aircraft fleet operated by an organization, wherein the additional training of the machine learning model increases accuracy of the machine learning model in detecting the anomalies for the aircraft fleet.

Clause 18

The method according to clause 17, wherein the organization is selected from a group comprising an airline, a government, and an aircraft manufacturer.

Clause 19

The method according to clause 16, 17 or 18, wherein selecting the images comprises:

selecting, by the computer system, images having the anomalies identified in the aircraft fleet in which selecting the images forms selected images, wherein the additional training of the machine learning model results in the machine learning model having increased accuracy in detecting the anomalies in wiring harnesses for the aircraft fleet.

Clause 20

The method according to clause 19, wherein the aircraft fleet is selected from a group comprising all aircraft operated by the organization, the aircraft of a same type, the aircraft on a same route, the aircraft with a same cabin configuration, or the aircraft within an age range.

Clause 21

The method according to one of clauses 15, 16, 17, 18, 19, or 20 further comprising:

generating, by the computer system, first synthetic wiring harness images with the anomalies using computer-aided design models of wiring harnesses and the anomalies defined by engineering standards;

generating, by the computer system, second synthetic wiring harness images with the anomalies using real images of the wiring harnesses with the anomalies;

classifying, by the computer system, the first synthetic wiring harness images and the second synthetic wiring harness images in which classifying forms labels for the first synthetic wiring harness images and the second synthetic wiring harness images; and adding, by the computer system, the first synthetic wiring harness images and the second synthetic wiring harness images with the labels to a training dataset.

Clause 22

The method according to one of clauses 15, 16, 17, 18, 19, 20, or 21 further comprising:

creating, by the computer system, synthetic wiring harness images using a second machine learning model trained to generate the synthetic wiring harness images from wiring harness images in a training dataset;

determining, by the computer system, whether the synthetic wiring harness images have the anomalies;

adding, by the computer system, labels to the synthetic wiring harness images to indicate whether the anomalies are present, wherein the synthetic wiring harness images with the anomalies are synthetic wiring anomaly images; and storing, by the computer system, the synthetic wiring harness images with the labels to create a synthetic training dataset.

Clause 23

The method according to clause 22, wherein the second machine learning model is a generative artificial intelligence model trained in a generative adversarial network to create the synthetic wiring harness images using wiring harness images.

Clause 24

The method according to one of clauses 15, 16, 17, 18, 19, 20, 21, 22, or 23 further comprising:

training a student machine learning model using a teacher machine learning model in which the student machine learning model is the machine learning model and is smaller in size than the teacher machine learning model, wherein the teacher machine learning model has been trained to detect the anomalies in the images of wiring harnesses.

Clause 25

The method according to one of clauses 15, 16, 17, 18, 19, 20, 21, 22, 23, or 24 further comprising:

identifying, by the computer system, a remedial action in response to the result indicating a presence of the anomaly in the wiring harness; and performing the remedial action on the wiring harness.

Clause 26

The method according to one of clauses 15, 16, 17, 18, 19, 20, 21, 22, 23, 24, or 25, wherein the mobile personal computing device is selected from a group comprising an extension rod, a handheld scanner, a smart phone, a mobile phone, a tablet, smart glasses, augmented reality goggles, a laptop computer, and a smart watch.

Clause 27

The method according to one of clauses 15, 16, 17, 18, 19, 20, 21, 22, 23, 24, 25 or 26, wherein the aerospace vehicle is selected from a group comprising an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a spacecraft, a jet aircraft, and a space shuttle.

Thus, the different illustrative examples provide a method, apparatus, system, and computer program product that can be used to inspect wiring harnesses and platforms such as aerospace vehicles. In one illustrative example, an aerospace wiring harness inspection system comprising a mobile personal computing device, a camera system connected to the mobile personal computing device, a machine learning model running in the mobile personal computing device, and a controller. The machine learning model is trained to detect anomalies in a set of images of a wiring harness in an aerospace vehicle. The controller configured to control the camera system to generate a set of images of the wiring harness send the set of images of the wiring harness to the machine learning model and receive a result from the machine learning model indicating whether an anomaly is present in the wiring harness.

The use of the aerospace wiring harness inspection system can result in identifying anomalies in wiring harnesses more efficiently as compared to current techniques. The use of machine learning models with specialized training datasets and training operations for training machine learning models that focus on wiring harnesses for aerospace vehicles can result in increased efficiency in identifying anomalies. In the different illustrative examples, the training datasets can be generated in a manner that provides increased amounts of training data for training machine learning models to identify wiring harness anomalies.

Further, with the use of feedback loops and continued training machine learning models, the aerospace wiring harness inspection system can have increasing accuracy in identifying anomalies. This increasing accuracy can be focused on specific aircraft fleets through the use of the system on those specific aircraft leads. Further, by continuing to train machine learning models based on images from those aircraft fleets, the machine learning models can more efficiently and accurately identify anomalies that occur over time that are specific to those aircraft fleets.

Additionally, the aerospace wiring harness inspection system can be implemented in mobile personal computing devices such as handheld scanners, mobile phones, smart glasses, and other devices. In these illustrative examples, the machine learning models can be created for use in these mobile personal computing devices such that the mobile computing devices can act as standalone devices without needing to send images to another location for analysis.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aerospace wiring harness inspection system comprising:
   a mobile personal computing device;
   a camera system connected to the mobile personal computing device;
   a machine learning model running in the mobile personal computing device, wherein the machine learning model is trained to detect anomalies in a set of images of a wiring harness in an aerospace vehicle; and
   an inspection manager configured to:
      control the camera system to generate a set of images of the wiring harness;
      send the set of images of the wiring harness to the machine learning model; and
      receive a result from the machine learning model indicating whether an anomaly is present in the wiring harness.

2. The aerospace wiring harness inspection system of claim 1 further comprising:
   a computer system configured to:
      store images captured by a set of mobile personal computing devices in which storing the images captured from a set of mobile personal computing devices forms stored images;
      store classifications of the anomalies identified in the images by the set of mobile personal computing devices in association with the stored images;
      select images from the stored images in which selecting the images forms selected images;

label the selected images with labels based on the classifications of the anomalies for the selected images; and
      perform additional training of the machine learning model using the selected images with the labels.

3. The aerospace wiring harness inspection system of claim 2, where the images are for an aircraft fleet operated by an organization, wherein the additional training of the machine learning model increases an accuracy of the machine learning model in detecting the anomalies for the aircraft fleet.

4. The aerospace wiring harness inspection system of claim 2, wherein in selecting the images, the computer system is configured to:
      select images having the anomalies identified in an aircraft fleet in which selecting the images forms selected images, wherein the additional training of the machine learning model results in the machine learning model having increased accuracy in detecting the anomalies in wiring harnesses for the aircraft fleet.

5. The aerospace wiring harness inspection system of claim 4, wherein the aircraft fleet is selected from a group comprising all aircraft operated by an organization, the aircraft of a same type, the aircraft on a same route, the aircraft with a same cabin configuration, or the aircraft within an age range.

6. The aerospace wiring harness inspection system of claim 1 further comprising:
   a computer system configured to:
   generate first synthetic wiring harness images with the anomalies using computer-aided design models of wiring harnesses and the anomalies defined by engineering standards;
   generate second synthetic wiring harness images with the anomalies using real images of the wiring harnesses with the anomalies;
   classify the first synthetic wiring harness images and the second synthetic wiring harness images in which classifying forms labels for the first synthetic wiring harness images and the second synthetic wiring harness images;
   add the first synthetic wiring harness images and the second synthetic wiring harness images with the labels to a training dataset; and
   train the machine learning model using the training dataset.

7. The aerospace wiring harness inspection system of claim 1 further comprising:
   a computer system configured to:
      create synthetic wiring harness images using a second machine learning model trained to generate the synthetic wiring harness images from wiring harness images in training dataset;
      determine whether the synthetic wiring harness images have the anomalies;
      add labels to the synthetic wiring harness images to indicate whether the anomalies are present, wherein the synthetic wiring harness images with the anomalies are synthetic wiring anomaly images;
      store the synthetic wiring harness images with the labels to create a synthetic training dataset; and
      train the machine learning model using the synthetic training dataset.

8. The aerospace wiring harness inspection system of claim 7, wherein the second machine learning model is a generative artificial intelligence model trained in a generative adversarial network to create the synthetic wiring harness images using wiring harness images.

9. The aerospace wiring harness inspection system of claim 1 further comprising:

a teacher machine learning model that has been trained to detect the anomalies in the images of wiring harnesses; and a computer system configured to:

train a student machine learning model using the teacher machine learning model in which the student machine learning model is the machine learning model and is smaller in size than the teacher machine learning model.

10. The aerospace wiring harness inspection system of claim 1, wherein the mobile personal computing device is selected from a group comprising an extension rod, a handheld scanner, a smart phone, a mobile phone, a tablet, smart glasses, augmented reality goggles, a laptop computer, and a smart watch.

11. The aerospace wiring harness inspection system of claim 1, wherein the aerospace vehicle is selected from a group comprising an aircraft, a commercial aircraft, a rotor-craft, a tilt-rotor aircraft, a tilt wing aircraft, a vertical takeoff and landing aircraft, an electrical vertical takeoff and landing vehicle, a personal air vehicle, a spacecraft, a jet aircraft, and a space shuttle.

12. A platform wiring inspection system comprising:

a mobile personal computing device;

a camera system connected to the mobile personal computing device;

a machine learning model running in the mobile personal computing device, wherein the machine learning model is trained to detect anomalies in images of wiring harnesses for a platform; and an inspection manager configured to:

control the camera system to generate a set of images of a wiring harness;

send the set of images of the wiring harness to the machine learning model; and receive a result from the machine learning model indicating whether an anomaly is present in the wiring harness.

13. The platform wiring inspection system of claim 12, wherein the platform is selected from a group comprising a mobile platform, a stationary platform, a land-based structure, an aquatic-based structure, a space-based structure, an aircraft, a commercial aircraft, a rotorcraft, a tilt-rotor air-craft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

14. A method for inspecting a wiring harness in an aerospace vehicle, the method comprising:

controlling, by a computer system, a camera system to generate a set of images of the wiring harness in the aerospace vehicle, wherein the camera system is connected to a mobile personal computing device;

sending, by the computer system, the set of images of the wiring harness to a machine learning model, wherein the machine learning model is trained to detect anomalies in a set of images of the wiring harness in the aerospace vehicle; and receiving, by the computer system, a result from the machine learning model indicating whether an anomaly is present in the wiring harness in the aerospace vehicle.

15. The method of claim 14 further comprising:

storing, by the computer system, images captured by a set of mobile personal computing devices in which storing the images captured from a set of mobile personal computing devices forms stored images;

storing, by the computer system, classifications of the anomalies identified in the images by the set of mobile personal computing devices in association with the stored images;

selecting, by the computer system, images from the stored images in which selecting the images forms selected images;

labeling, by the computer system, the selected images with labels based on the classifications of the anomalies for the selected images; and performing, by the computer system, additional training of the machine learning model using the selected images with the labels.

16. The method of claim 15, wherein selecting the images comprises:

selecting, by the computer system, images having the anomalies identified in the aircraft fleet in which selecting the images forms selected images, wherein the additional training of the machine learning model results in the machine learning model having increased accuracy in detecting the anomalies in wiring harnesses for the aircraft fleet.

17. The method of claim 16, wherein the aircraft fleet is selected from a group comprising all aircraft operated by the organization, the aircraft of a same type, the aircraft on a same route, the aircraft with a same cabin configuration, or the aircraft within an age range.

18. The method of claim 14 further comprising:

generating, by the computer system, first synthetic wiring harness images with the anomalies using computer-aided design models of wiring harnesses and the anomalies defined by engineering standards;

generating, by the computer system, second synthetic wiring harness images with the anomalies using real images of the wiring harnesses with the anomalies;

classifying, by the computer system, the first synthetic wiring harness images and the second synthetic wiring harness images in which classifying forms labels for the first synthetic wiring harness images and the second synthetic wiring harness images; and adding, by the computer system, the first synthetic wiring harness images and the second synthetic wiring harness images with the labels to a training dataset.

19. The method of claim 14 further comprising:

creating, by the computer system, synthetic wiring harness images using a second machine learning model trained to generate the synthetic wiring harness images from wiring harness images in a training dataset;

determining, by the computer system, whether the synthetic wiring harness images have the anomalies;

adding, by the computer system, labels to the synthetic wiring harness images to indicate whether the anomalies are present, wherein the synthetic wiring harness images with the anomalies are synthetic wiring anomaly images; and storing, by the computer system, the synthetic wiring harness images with the labels to create a synthetic training dataset.

20. The method of claim 14 further comprising:

training a student machine learning model using a teacher machine learning model in which the student machine learning model is the machine learning model and is smaller in size than the teacher machine learning model, wherein the teacher machine learning model has been trained to detect the anomalies in the images of wiring harnesses.

21. The method of claim 14 further comprising:

identifying, by the computer system, a remedial action in response to the result indicating a presence of the anomaly in the wiring harness; and performing the remedial action on the wiring harness.

\* \* \* \* \*